US012561214B2

(12) United States Patent
Rath

(10) Patent No.: US 12,561,214 B2
(45) Date of Patent: Feb. 24, 2026

(54) INCREASE QUALITY IN ARTIFICIAL INTELLIGENCE WITH REFERENCE TRACKING

(71) Applicant: SAP SE, Walldorf (DE)

(72) Inventor: Ralf Rath, Viernheim (DE)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 18/647,173

(22) Filed: Apr. 26, 2024

(65) Prior Publication Data

US 2025/0335317 A1     Oct. 30, 2025

(51) Int. Cl.
*G06F 11/14*            (2006.01)
(52) U.S. Cl.
CPC ........ *G06F 11/1476* (2013.01); *G06F 11/142* (2013.01); *G06F 2201/81* (2013.01)
(58) Field of Classification Search
CPC . G06F 11/1476; G06F 11/142; G06F 2201/81
USPC .......................................................... 714/3
See application file for complete search history.

(56) References Cited

U.S. PATENT DOCUMENTS

2024/0054058 A1* 2/2024 Portman ............. G06F 11/1476

* cited by examiner

*Primary Examiner* — Yair Leibovich
(74) *Attorney, Agent, or Firm* — Mintz Levin Cohn Ferris Glovsky and Popeo, P.C.

(57)            ABSTRACT

A machine learning model is trained with a training dataset, where the machine learning model comprises a plurality of layers. During training, values of a plurality of coefficients of one or more layers are monitored. In response to detecting a change of a given coefficient by more than a threshold during a given training run, a given reference to a given input dataset of the given training run is stored. In response to detecting an output error of a trained version of the machine learning model, the given reference to the given input dataset is retrieved if the given coefficient is located on a backward path providing more than a threshold contribution to the output error. Next, the given reference is provided to an application analyzing the trained version of the machine learning model in order to determine a cause of the output error.

20 Claims, 26 Drawing Sheets

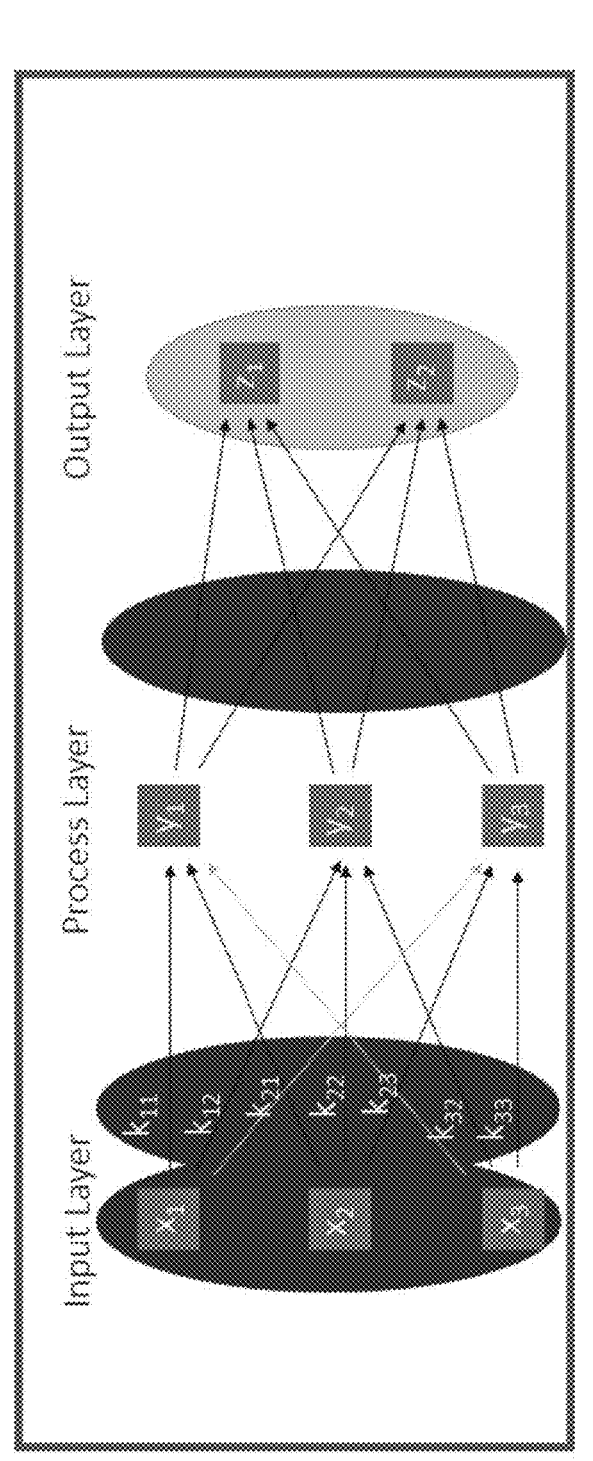
$$\vec{y} = K\,\vec{x}$$
$$\vec{z} = K_2\,\vec{y} = K_2\,K\,\vec{x}$$
$y_1 = k_{11}\,x_1 + k_{21}\,x_2 + k_{31}\,x_3$
$y_2 = k_{12}\,x_1 + k_{22}\,x_2 + k_{32}\,x_3$
$y_3 = k_{13}\,x_1 + k_{23}\,x_2 + k_{33}\,x_3$
*FIG. 4*

600

Input Layer          Hidden Layer          Output Layer

If a coefficient $k_{nij}$ used for the result calculation of more than x% then add the references of the training data to the output.

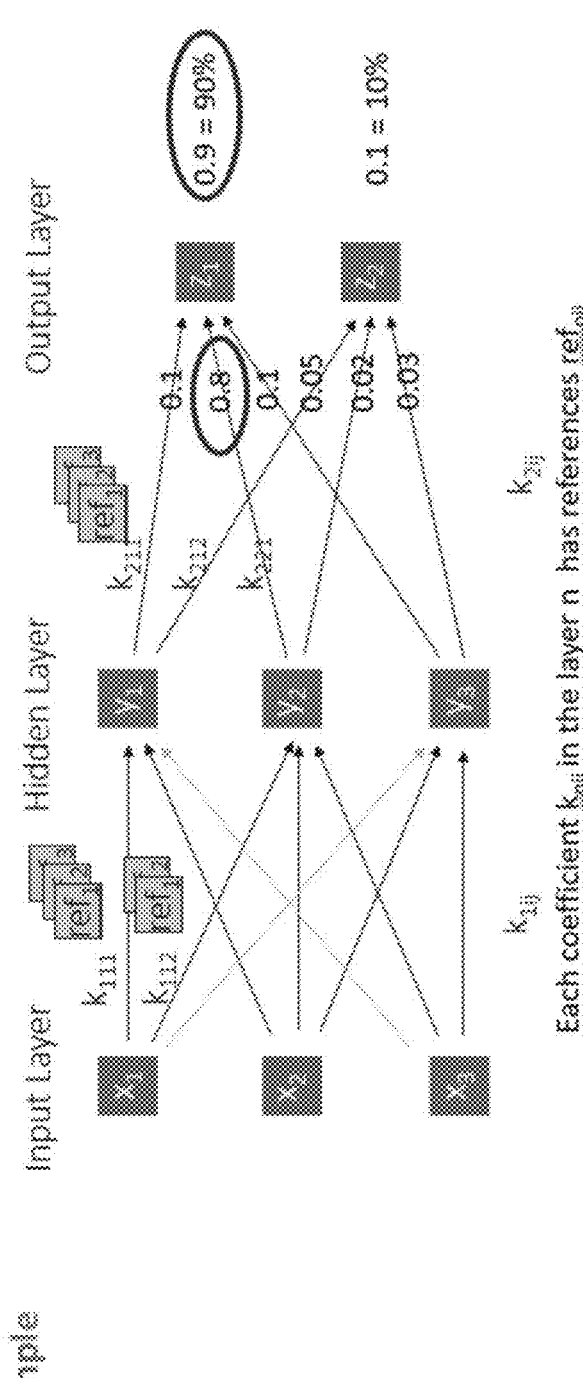
*FIG. 11*

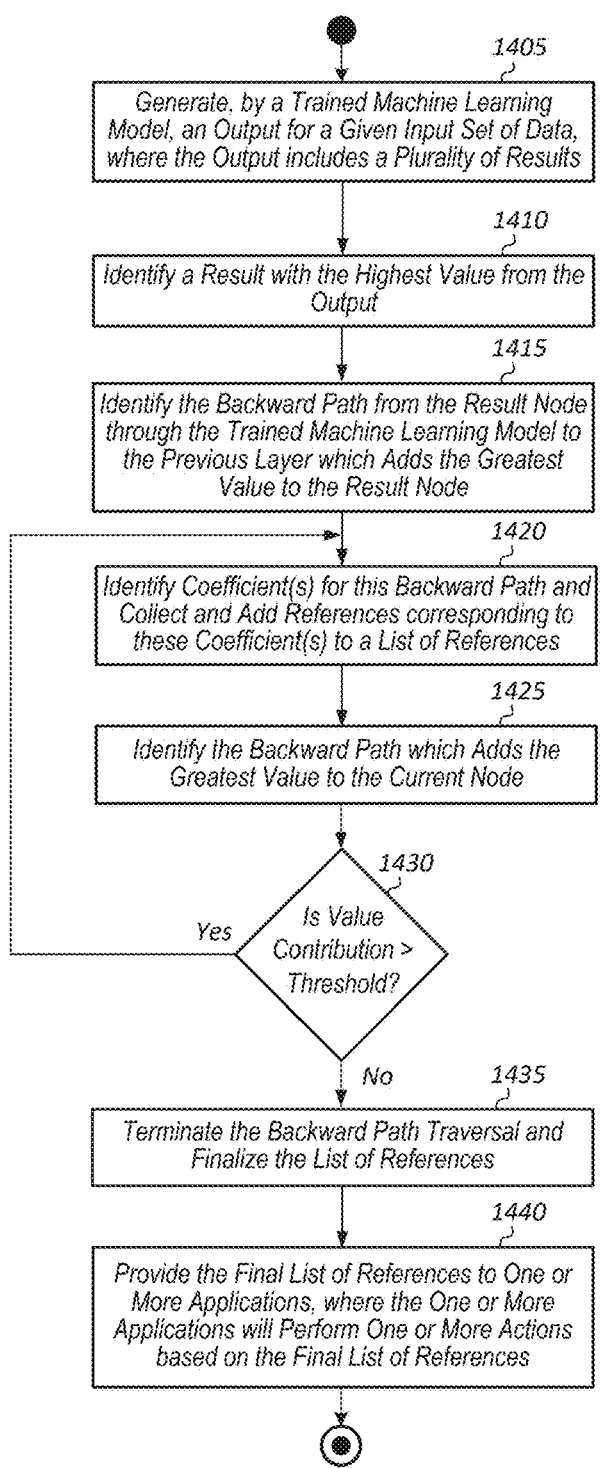

*1400*

*1405*

Generate, by a Trained Machine Learning Model, an Output for a Given Input Set of Data, where the Output includes a Plurality of Results

*1410*

Identify a Result with the Highest Value from the Output

*1415*

Identify the Backward Path from the Result Node through the Trained Machine Learning Model to the Previous Layer which Adds the Greatest Value to the Result Node

*1420*

Identify Coefficient(s) for this Backward Path and Collect and Add References corresponding to these Coefficient(s) to a List of References

*1425*

Identify the Backward Path which Adds the Greatest Value to the Current Node

*1430*

Is Value Contribution > Threshold?

Yes

No

*1435*

Terminate the Backward Path Traversal and Finalize the List of References

*1440*

Provide the Final List of References to One or More Applications, where the One or More Applications will Perform One or More Actions based on the Final List of References

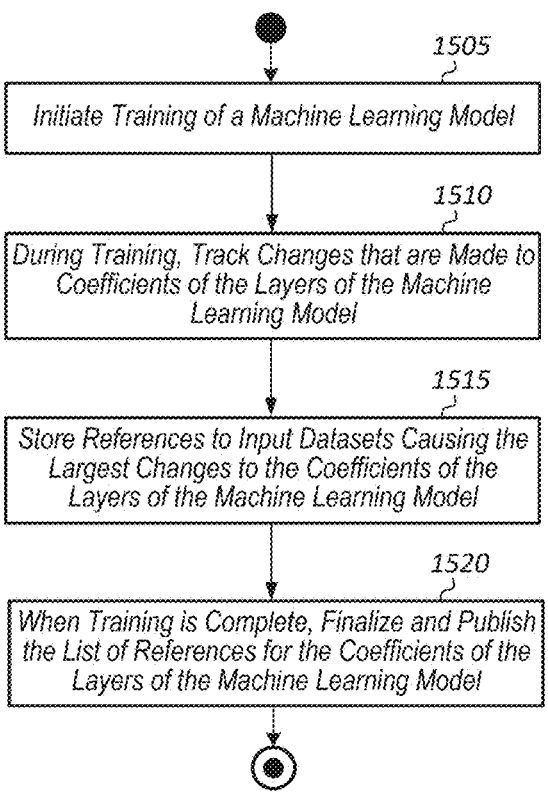

1505

Initiate Training of a Machine Learning Model

1510

During Training, Track Changes that are Made to Coefficients of the Layers of the Machine Learning Model

1515

Store References to Input Datasets Causing the Largest Changes to the Coefficients of the Layers of the Machine Learning Model

1520

When Training is Complete, Finalize and Publish the List of References for the Coefficients of the Layers of the Machine Learning Model

_1700_

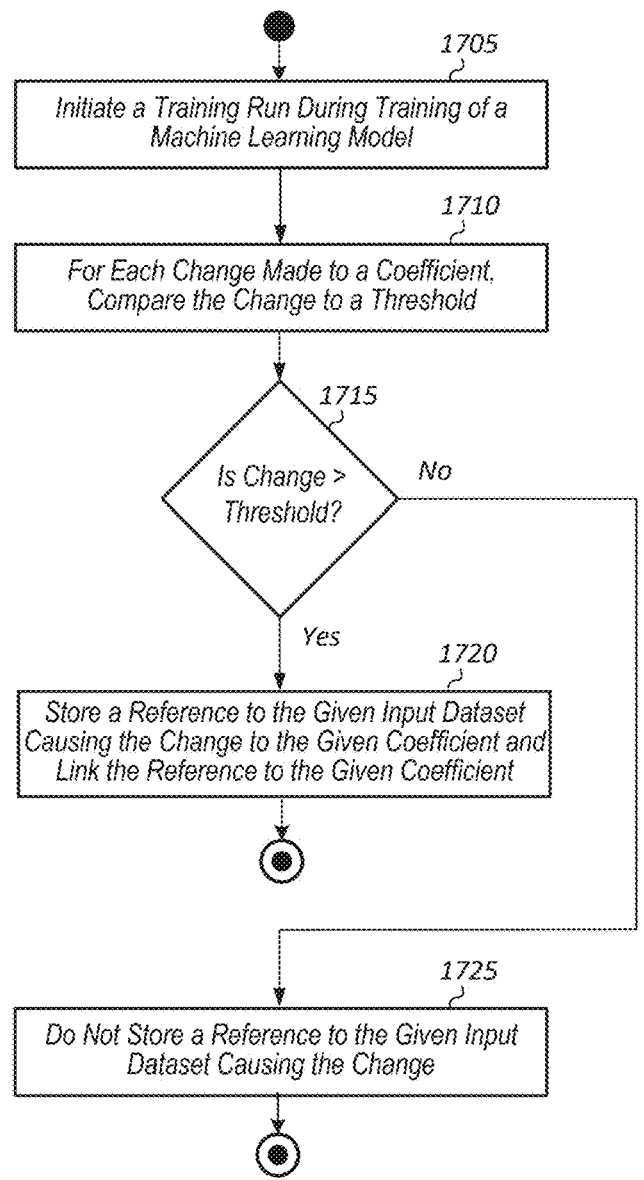

_1705_

Initiate a Training Run During Training of a Machine Learning Model

_1710_

For Each Change Made to a Coefficient, Compare the Change to a Threshold

_1715_

Is Change > Threshold?

No

Yes

_1720_

Store a Reference to the Given Input Dataset Causing the Change to the Given Coefficient and Link the Reference to the Given Coefficient

_1725_

Do Not Store a Reference to the Given Input Dataset Causing the Change

_FIG. 17_

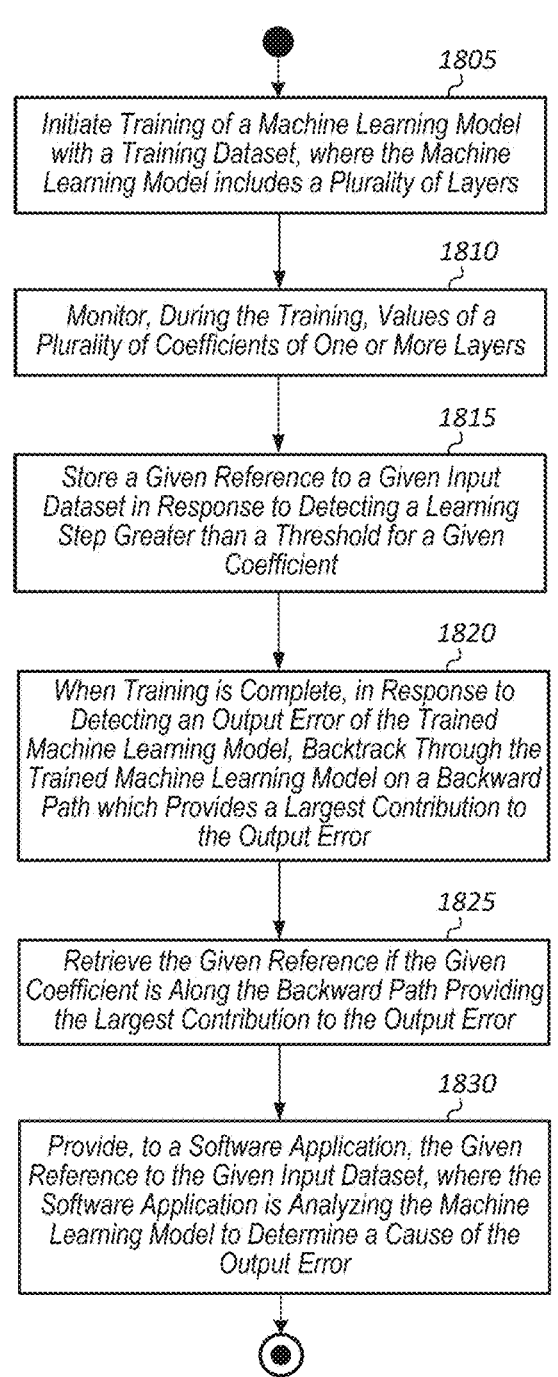

*1800*

*1805*

Initiate Training of a Machine Learning Model with a Training Dataset, where the Machine Learning Model includes a Plurality of Layers

*1810*

Monitor, During the Training, Values of a Plurality of Coefficients of One or More Layers

*1815*

Store a Given Reference to a Given Input Dataset in Response to Detecting a Learning Step Greater than a Threshold for a Given Coefficient

*1820*

When Training is Complete, in Response to Detecting an Output Error of the Trained Machine Learning Model, Backtrack Through the Trained Machine Learning Model on a Backward Path which Provides a Largest Contribution to the Output Error

*1825*

Retrieve the Given Reference if the Given Coefficient is Along the Backward Path Providing the Largest Contribution to the Output Error

*1830*

Provide, to a Software Application, the Given Reference to the Given Input Dataset, where the Software Application is Analyzing the Machine Learning Model to Determine a Cause of the Output Error

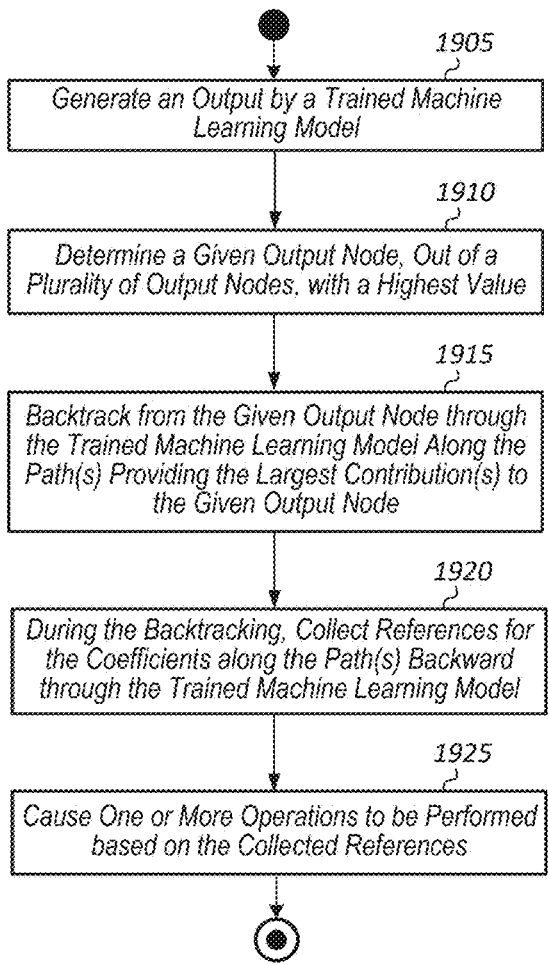

1905

Generate an Output by a Trained Machine Learning Model

1910

Determine a Given Output Node, Out of a Plurality of Output Nodes, with a Highest Value

1915

Backtrack from the Given Output Node through the Trained Machine Learning Model Along the Path(s) Providing the Largest Contribution(s) to the Given Output Node

1920

During the Backtracking, Collect References for the Coefficients along the Path(s) Backward through the Trained Machine Learning Model

1925

Cause One or More Operations to be Performed based on the Collected References

_FIG. 19_

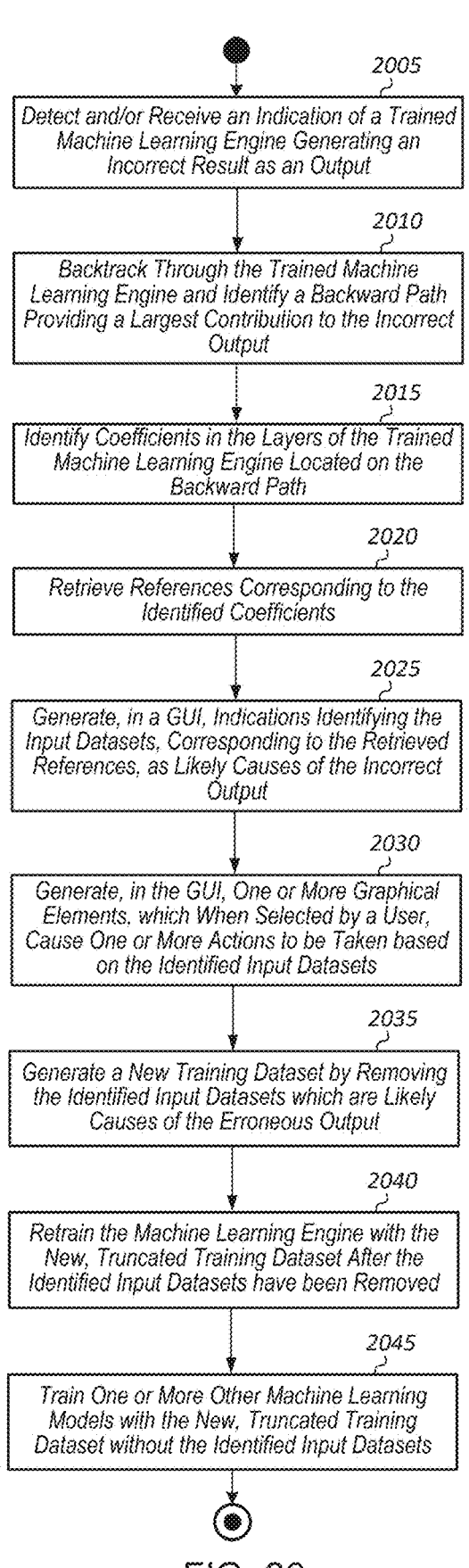

*2000*

*2005*

Detect and/or Receive an Indication of a Trained Machine Learning Engine Generating an Incorrect Result as an Output

*2010*

Backtrack Through the Trained Machine Learning Engine and Identify a Backward Path Providing a Largest Contribution to the Incorrect Output

*2015*

Identify Coefficients in the Layers of the Trained Machine Learning Engine Located on the Backward Path

*2020*

Retrieve References Corresponding to the Identified Coefficients

*2025*

Generate, in a GUI, Indications Identifying the Input Datasets, Corresponding to the Retrieved References, as Likely Causes of the Incorrect Output

*2030*

Generate, in the GUI, One or More Graphical Elements, which When Selected by a User, Cause One or More Actions to be Taken based on the Identified Input Datasets

*2035*

Generate a New Training Dataset by Removing the Identified Input Datasets which are Likely Causes of the Erroneous Output

*2040*

Retrain the Machine Learning Engine with the New, Truncated Training Dataset After the Identified Input Datasets have been Removed

*2045*

Train One or More Other Machine Learning Models with the New, Truncated Training Dataset without the Identified Input Datasets

Figure 21:
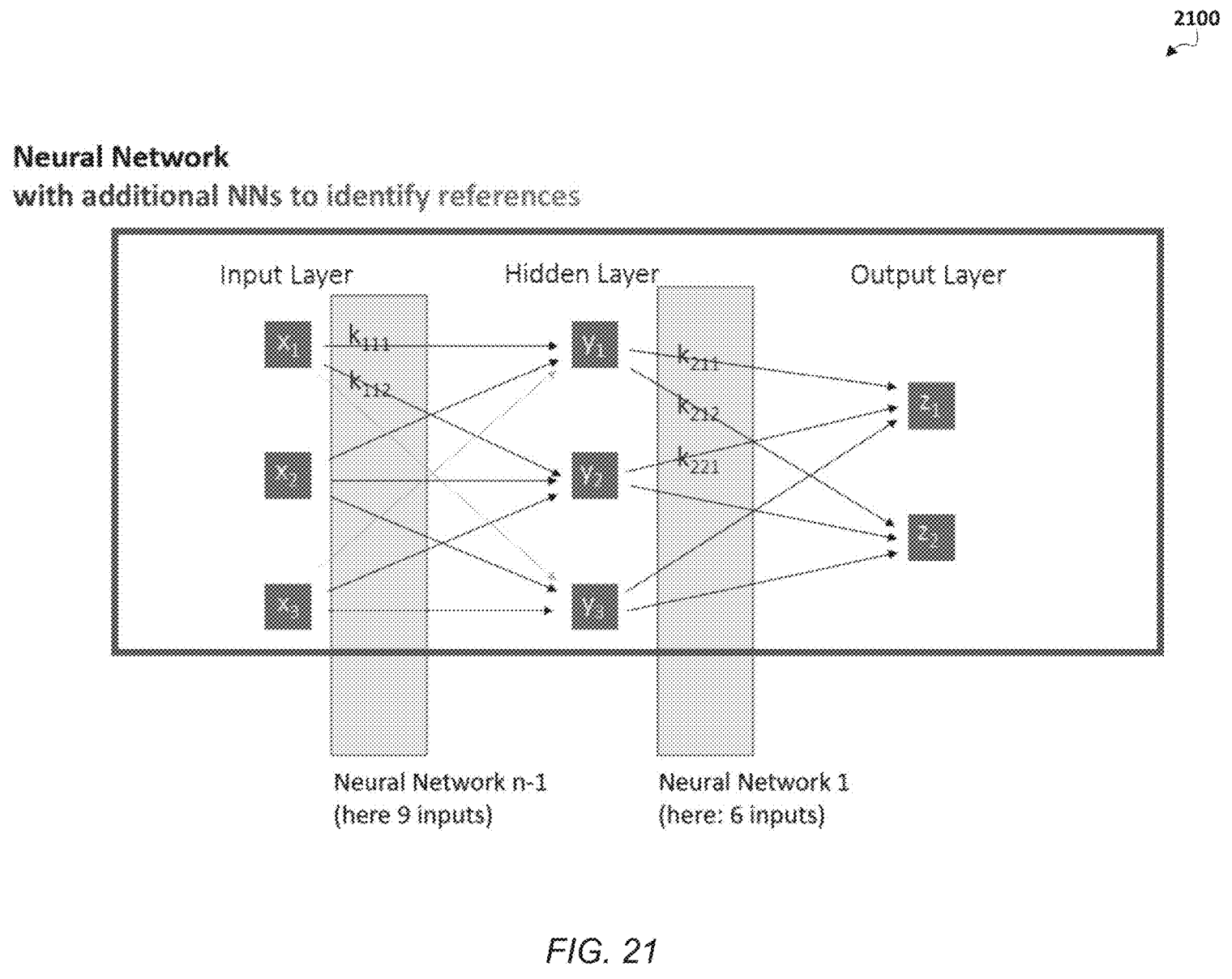

Neural Network
with additional NNs to identify references

Input Layer

Hidden Layer

Output Layer $k_{111}$
$k_{112}$ $k_{211}$
$k_{212}$
$k_{221}$

Neural Network n-1
(here 9 inputs)

Neural Network 1
(here: 6 inputs)

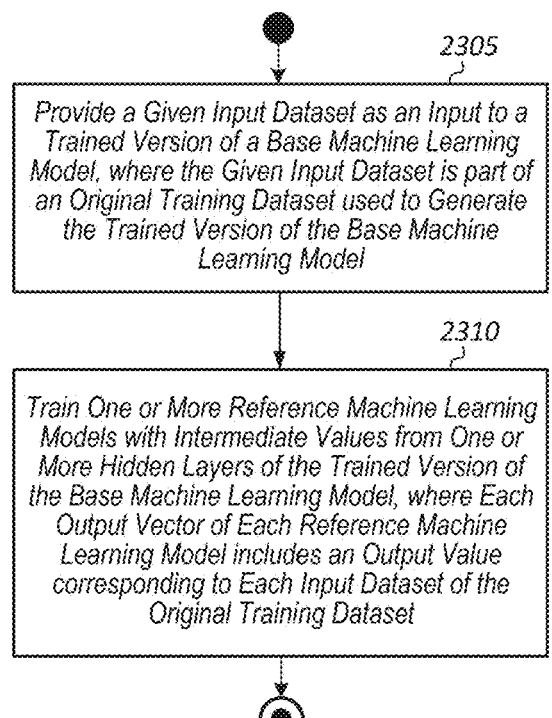

*2305*

Provide a Given Input Dataset as an Input to a
Trained Version of a Base Machine Learning
Model, where the Given Input Dataset is part of
an Original Training Dataset used to Generate
the Trained Version of the Base Machine
Learning Model

*2310*

Train One or More Reference Machine Learning
Models with Intermediate Values from One or
More Hidden Layers of the Trained Version of
the Base Machine Learning Model, where Each
Output Vector of Each Reference Machine
Learning Model includes an Output Value
corresponding to Each Input Dataset of the
Original Training Dataset

*FIG. 23*

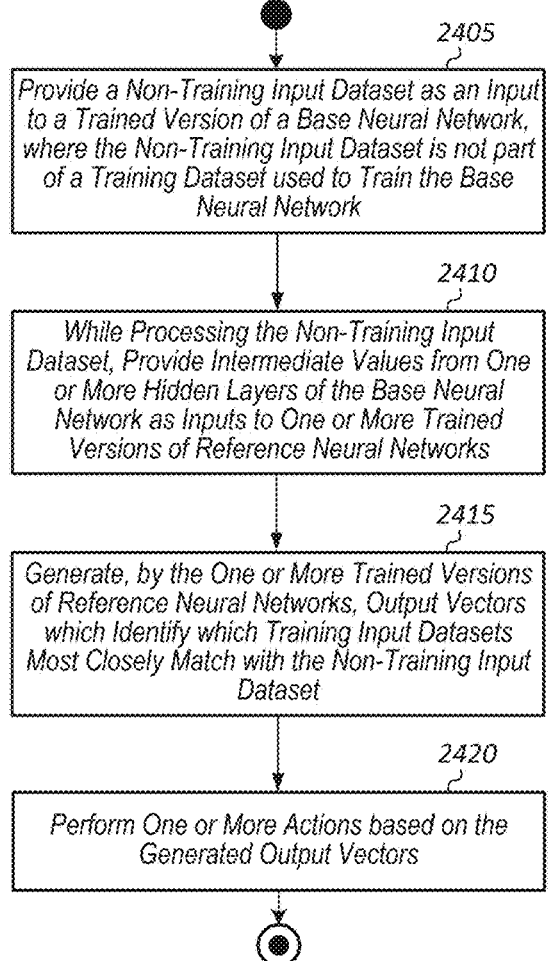

2400

2405

Provide a Non-Training Input Dataset as an Input to a Trained Version of a Base Neural Network, where the Non-Training Input Dataset is not part of a Training Dataset used to Train the Base Neural Network

2410

While Processing the Non-Training Input Dataset, Provide Intermediate Values from One or More Hidden Layers of the Base Neural Network as Inputs to One or More Trained Versions of Reference Neural Networks

2415

Generate, by the One or More Trained Versions of Reference Neural Networks, Output Vectors which Identify which Training Input Datasets Most Closely Match with the Non-Training Input Dataset

2420

Perform One or More Actions based on the Generated Output Vectors

FIG. 24

INCREASE QUALITY IN ARTIFICIAL INTELLIGENCE WITH REFERENCE TRACKING

TECHNICAL FIELD

The present disclosure generally relates to generating references when training machine learning models.

BACKGROUND

Generative artificial intelligence (AI) models are not always consistent in generating high-quality content. They can produce plausible-sounding but incorrect or nonsensical information, especially when prompted with ambiguous or challenging inputs. AI models require large amounts of data for training, and the quality of the training data directly affects the quality of generated content. Generative models can amplify and perpetuate biases present in the training data. They may produce biased or inaccurate content, which can have negative business implications.

AI models are often described as "black boxes" because it can be challenging to interpret how they generate specific outputs. This lack of transparency can be a problem in critical applications where decisions need to be explainable. Customers do not have an insight and cannot adjust or customize the content or output.

Also, generative models can be used maliciously to create fake content, such as deepfakes or fraudulent documents, which can have serious consequences for security and misinformation. AI models can sometimes overfit to their training data, meaning they become too specialized and generate content that closely matches the training data but lacks diversity and creativity. Scaling up generative AI models to handle longer and more complex content can be challenging and may result in performance degradation. The output cannot be controlled and the system might become unmaintainable.

SUMMARY

In some implementations, a machine learning model is trained with a training dataset, where the machine learning model comprises a plurality of layers. During training, values of a plurality of coefficients of one or more layers are monitored. In response to detecting a change of a given coefficient by more than a threshold during a given training run, a given reference to a given input dataset of the given training run is stored. In response to detecting an output error of a trained version of the machine learning model, the given reference to the given input dataset is retrieved if the given coefficient is located on a backward path providing more than a threshold contribution to the output error. Next, the given reference is provided to an application analyzing the trained version of the machine learning model in order to determine a cause of the output error.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates a diagram of a portion of a neural network, in accordance with some example implementations of the current subject matter;

FIG. 11 illustrates a diagram of a portion of a trained neural network, in accordance with some example implementations of the current subject matter;

FIG. 14 illustrates an example of a process for generating a list of references most impactful to an output of a trained machine learning model, in accordance with some example implementations of the current subject matter;

FIG. 15 illustrates an example of a process for determining which references to store during training, in accordance with some example implementations of the current subject matter;

FIG. 17 illustrates an example of a process for determining which references to store during training, in accordance with some example implementations of the current subject matter;

FIG. 18 illustrates an example of a process for determining a cause of a machine learning engine generating an incorrect result, in accordance with some example implementations of the current subject matter;

FIG. 19 illustrates an example of a process for determining pertinent references for a trained machine learning model, in accordance with some example implementations of the current subject matter;

FIG. 20 illustrates an example of a process for responding to a machine learning engine generating an incorrect result, in accordance with some example implementations of the current subject matter;

FIG. 21 illustrates a diagram of a portion of a trained neural network, in accordance with some example implementations of the current subject matter;

FIG. 23 illustrates an example of a process for training reference machine learning models associated with a base machine learning model, in accordance with some example implementations of the current subject matter;

FIG. 24 illustrates an example of a process for determining which training input datasets most closely match a non-training input dataset, in accordance with some example implementations of the current subject matter;

DETAILED DESCRIPTION

Figure 1:
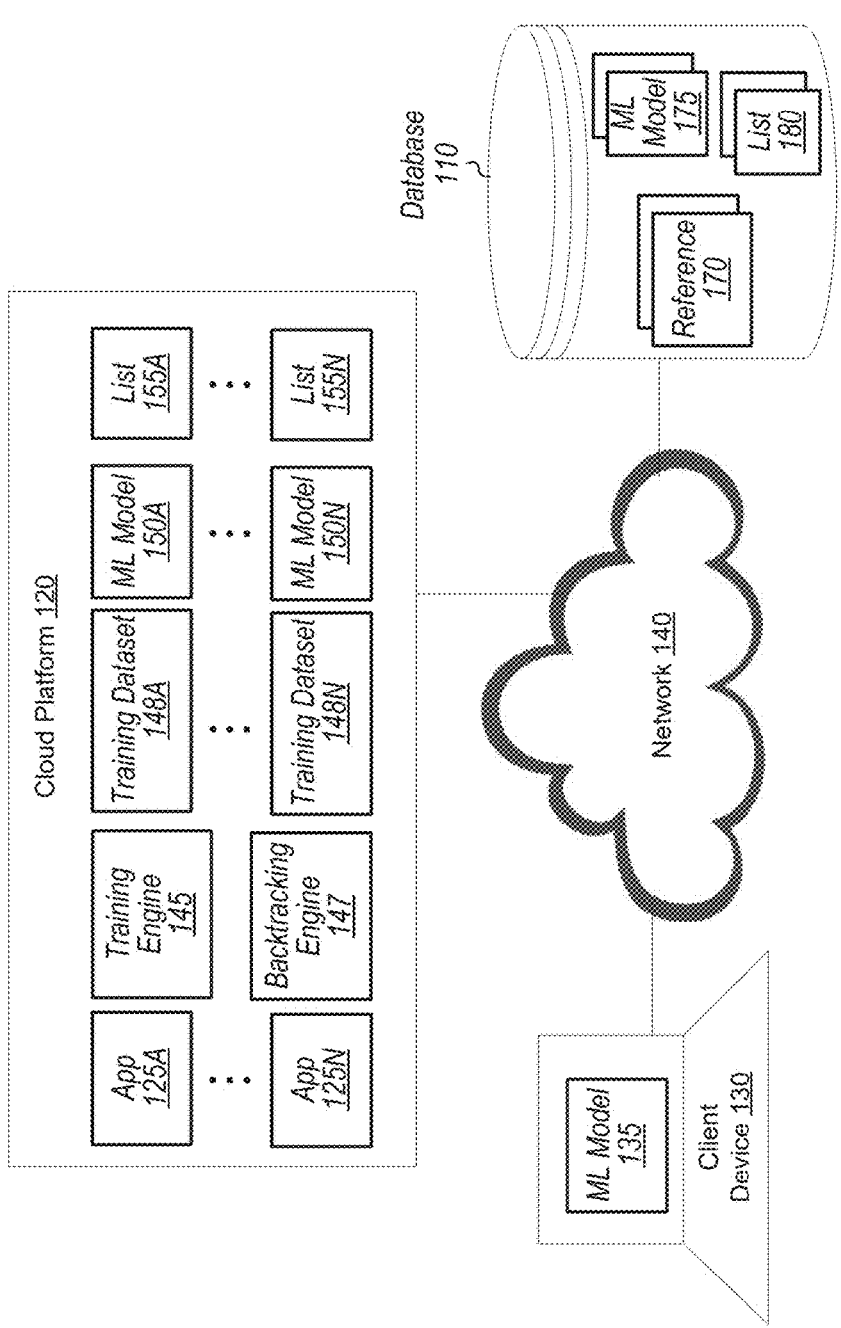
FIG. 1 illustrates a logical diagram of an example of a computing system, in accordance with some example implementations of the current subject matter.

FIG. 1 depicts an example of a computing system 100, in accordance with some example embodiments. Referring to FIG. 1, the computing system 100 may include a database 110, a cloud platform 120, and a client device 130. In an example, cloud platform 120 includes a training engine 145, backtracking engine 147, machine learning (ML) models 150A-N, lists 155A-N, and software applications 160A-N. Machine learning models 150A-N may include trained versions of machine learning models, untrained versions of machine learning models, and/or machine learning models in the process of being trained (i.e., currently undergoing training). Tracking engine 145 and backtracking engine 147 may be implemented using any suitable combination of hardware (e.g., circuitry, one or more processing units) and/or software (e.g., instructions, firmware). In other examples, cloud platform 120 may include other types of components. It is noted that backtracking engine 147 may also be referred to as a traceability engine.

The cloud platform 120 may provide resources that can be shared among a plurality of tenants. For example, the cloud platform 120 may be configured to provide a variety of services including, for example, software-as-a-service (SaaS), platform-as-a-service (PaaS), infrastructure as a service (IaaS), and/or the like, and these services can be accessed by one or more tenants of the cloud platform 120. In the example of FIG. 1, the system 100 includes a client device 130, although system 100 may include any number of other clients (i.e., tenants). For example, multitenancy enables multiple end-user devices (e.g., a computer including an application) to access a given cloud service having shared resources via the Internet and/or other type of network or communication link(s).

The cloud platform 120 may include resources, such as at least one computer (e.g., a server), data storage, and a network (including network equipment) that couples the computer(s) and storage. The cloud platform 120 may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of a "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform 120 may be a "private" cloud platform, in which case the resources of the cloud platform 120 may be hosted on an entity's own private servers (e.g., dedicated corporate servers operated and/or owned by the entity). Alternatively, or additionally, the cloud platform 120 may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In some embodiments, some of the components shown in cloud platform 120 may be included as part of client device 130 or as part of computing apparatus or a computing system distinct from cloud platform 120 and client device 130. It is noted that while only a single database 110 and a single client device 130 are shown, this is merely to avoid cluttering the figure. It should be appreciated that database 110 is representative of any number of databases 110 and that client device 130 is representative of any number of client devices that may be included as part of computing system 100.

In an example, training engine 145 is configured to train one or more machine learning models 150A-N. During training, training engine 145 may utilize a corresponding training dataset 148A-N when training a given machine learning model 150A-N. In other words, each machine learning model 150A-N may have a corresponding training dataset 148A-N which is used to train the respective machine learning model 150A-N. Alternatively, some training datasets 148A-N may be shared by multiple machine learning models 150A-N. Each training dataset 148A-N may include a plurality of input datasets, with each input dataset used for a single training pass through the corresponding machine learning model 150A-N. For example, if a given machine learning model 150N is being trained to differentiate between images of cats and dogs, then each input dataset would be an image of a cat or a dog with a label identifying the image as a cat or dog. The label may also be referred to as the "known output".

During training of a particular machine learning model 150A, training engine 145 may track changes in the coefficients of the layers of the machine learning model 150A. For example, for a coefficient of a given layer of the machine learning model 150A, if the coefficient changes by more than a threshold amount during a given training run, then a reference to the input dataset, of the corresponding training dataset 148A, used during this given training run may be saved for this coefficient. The reference may be stored in list 155A. As used herein, the term "coefficient" may be defined as a configurable value applied to the value of a node (i.e., neuron) of a first layer in order to generate the value of a node of a second layer, where the second layer is connected (i.e., adjacent) to the first layer. It is noted that the term "coefficient" may also be referred to as a "weight".

The coefficients of a machine learning model are the values which are adjusted (i.e., trained) during training of the machine learning model. As used herein, the term "reference" may be defined as a training set of data used to train a machine learning model during one pass through the machine learning model. The training set of data used to train a machine learning model during one pass through the machine learning model may also be referred to as an "input dataset". A "training dataset" may be defined as the entirety of the input datasets used to train a given machine learning model. A "reference" may include an input dataset (e.g., an image) and a known output. The term "known output" may be defined as the expected result of the machine learning model processing the given input dataset. The term "expected output" may be used interchangeably herein with the term "known output". For example, if the machine learning model is designed to determine whether an input image is a cat or a dog, then if a first input dataset is a picture of a cat, the known output would be an identification of the picture as a cat.

In some cases, training engine 145 may keep track of the largest change that occurs for each coefficient of the layers of a particular machine learning model 150A undergoing training. If a change occurs for a given coefficient that is larger than the largest tracked change, then this new change replaces the largest tracked change, and a reference to the input dataset that caused this new change replaces the previous reference for the given coefficient in list 155A. It is noted that these techniques may be performed for each layer of the machine learning model 150A during training. The end result of tracking coefficients and storing references to specific input datasets is a corresponding list 155A. List 155A, which may also be referred to as list of references 155A, includes references to the input datasets that caused the greatest changes for the coefficients of machine learning model 150A.

In an example, when training a given machine learning model 150A, training engine 145 may track changes to all of the coefficients of all of the layers of the given machine learning model 150A. In this example, the list 155A that is generated for given machine learning model 150A will have references for all of the coefficients of all of the layers of the given machine learning model 150A. In another example, when training a given machine learning model 150N, training engine 145 may track changes to all of the coefficients of a subset of the layers of the given machine learning model 150N. In this example, the list 155N that is generated for given machine learning model 150N will have references for all of the coefficients of a subset of the layers of the given machine learning model 150N. For this example, the subset of the layers that are chosen to be tracked may be chosen based on an analysis performed by tracking engine 145. In an example, coefficients of the last N layers of the given machine learning model 150N may be tracked, where N is a positive integer, and where the value of N is configurable.

In a further example, when training a given machine learning model 150A, training engine 145 may track changes to a subset of the coefficients of a subset of the layers of the given machine learning model 150A. In this example, the list 155A that is generated for given machine learning model 150A will have references for a subset of the coefficients of a subset of the layers of the given machine learning model 150A. This may help to reduce the size of the given list 155A. The subset of coefficients that are tracked may be chosen based on their locations within each layer. The subset of coefficients that are tracked may be chosen based on an analysis performed by training engine 145.

In other examples, one or more of machine learning models 150A-N may already be trained, having been trained by one or more other computing systems. In these cases, cloud platform 120 receives already trained machine learning models 150A-N from one or more other computing systems. Additionally, cloud platform 120 may receive lists 155A-N corresponding to the already trained machine learning models 150A-N, with each list 155A-N including links to references that caused the biggest changes for coefficients of a corresponding machine learning model 150A-N.

When a trained machine learning model 150A is utilized by cloud platform 120 to process an actual, non-training input dataset (i.e., an input dataset not used for training purposes), backtracking engine 147 may analyze the output result generated by the trained machine learning model 150A. The analysis may involve selecting an output node with a highest value among the output result, and then backtracking back from the output node of the output layer to the hidden layers. For example, if the output layer is the $N_{th}$ layer of the trained machine learning model 150A, with N being a positive integer greater than one, then backtracking engine 147 will proceed from the output layer to the N−1 layer, then to the N−2 layer, then to the N−3 layer, and so on. As backtracking engine 147 backtracks through the trained machine learning model 150A, backtracking engine 147 will follow the path that provides the biggest contribution to the output node. At each layer during the backtracking, backtracking engine 147 will collect references from the corresponding list 155A for the coefficients along the path providing the biggest contribution to the output node. These references may be stored as references 170 as shown in database 110. Alternatively, these references may be stored locally in cloud platform 120. Backtracking engine 147 may continue backward for some number of layers, until a threshold contribution percentage is reached, or until some other condition is detected. Then, after references 170 have been collected on the backward path, one or more applications 125A-N may utilize the references 170 to perform one or more actions. These actions may include retraining the trained machine learning model 150A without the input datasets identified by references 170, removing input datasets identified by references 170 from a corresponding training dataset 148A, training one or more other machine learning models with the corresponding training dataset 148A after the removal of the input datasets identified by references 170, generating a graphical user interface (GUI)

with a list of the identities of the input datasets specified by references 170s, and/or other types of actions.

In an example, a trained machine learning model 150N may generate an erroneous output when processing a given input dataset. In this example, backtracking engine 147 may process the erroneous output as described above by backtracking from the output result back through the hidden layers of the trained machine learning model 150N. Proceeding along the backward path which provides the largest contribution to the output result, backtracking engine 147 may collect references for the coefficients on the backward path. These collected references may then be identified as likely causes of the erroneous output.

One or more actions may be taken as a result of collecting these references. In an example, a GUI may be generated displaying these collected references. The GUI may include graphical elements or links allowing a user to remove these references from a corresponding training dataset 148N. In another example, the collected references may automatically be removed from a corresponding training dataset 148N. In a further example, after the collected references are removed from the corresponding training dataset 148N, one or more machine learning models 150A-N may be trained with the updated, truncated training dataset 148N.

The database 110, the cloud platform 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. Database 110 may store any number of references 170, any number of machine learning models 175, and any number of lists 180, with lists 180 including references to the input datasets causing the largest changes to the coefficients of machine learning models 175.

The cloud platform 120 may be configured to respond to requests from the client device 130 and/or one or more other client devices. For example, as shown in FIG. 1, the client device 130 may communicate with the cloud platform 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like. Client device 130 may include at least machine learning model 135. Client device 130 may also include one or more other components which are shown in cloud platform 120. In some cases, client device 130 may execute a software agent that is controlled by and/or in communication with one or more engines or applications executing on cloud platform 120.

Figure 2:
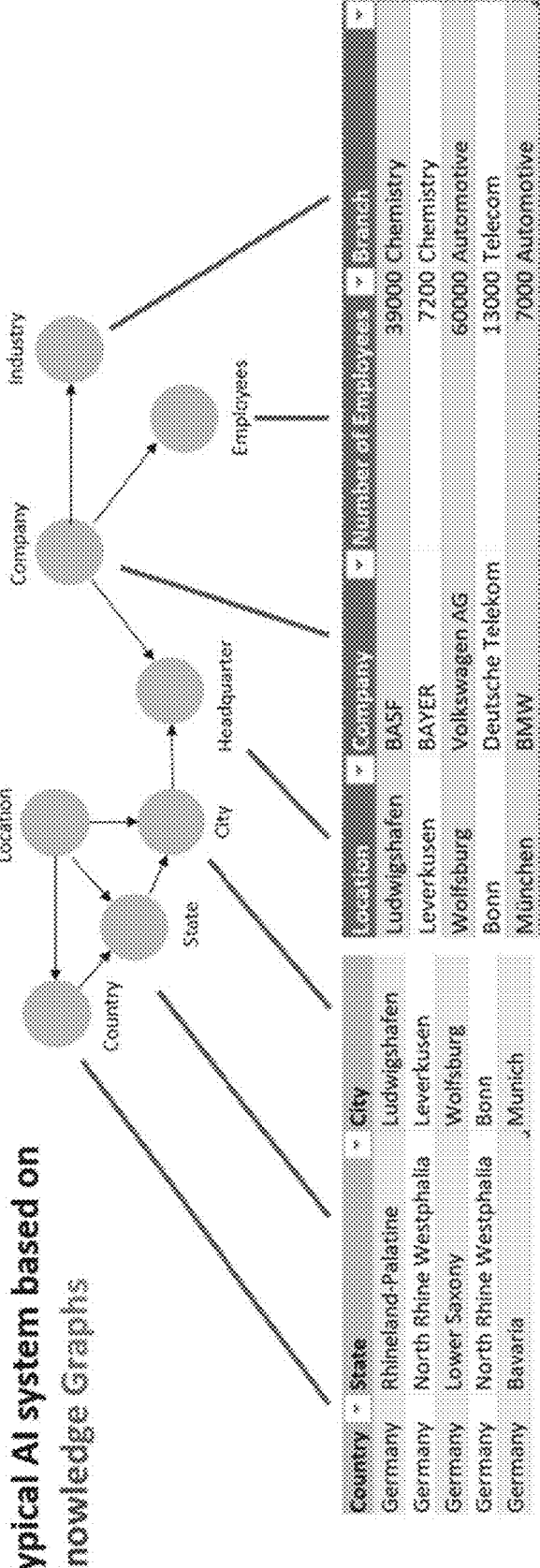
FIG. 2 illustrates a diagram of a portion of a knowledge graph, in accordance with some example implementations of the current subject matter.

Turning now to FIG. 2, a diagram of a portion of a knowledge graph 200 is shown, in accordance with one or more embodiments of the current subject matter. Artificial intelligence (AI) systems may be based on knowledge graphs, with an example knowledge graph 200 shown in FIG. 2. The links between country, state, and city are shown on the left-side of knowledge graph 200, with links between company, industry, and employees shown on the right-side of knowledge graph 200. Examples of semantical searches are shown below knowledge graph 200, with these examples including: (1) How many employees work in the chemical industry in Germany? and (2) In which state is the largest German automotive company located?

Figure 3:
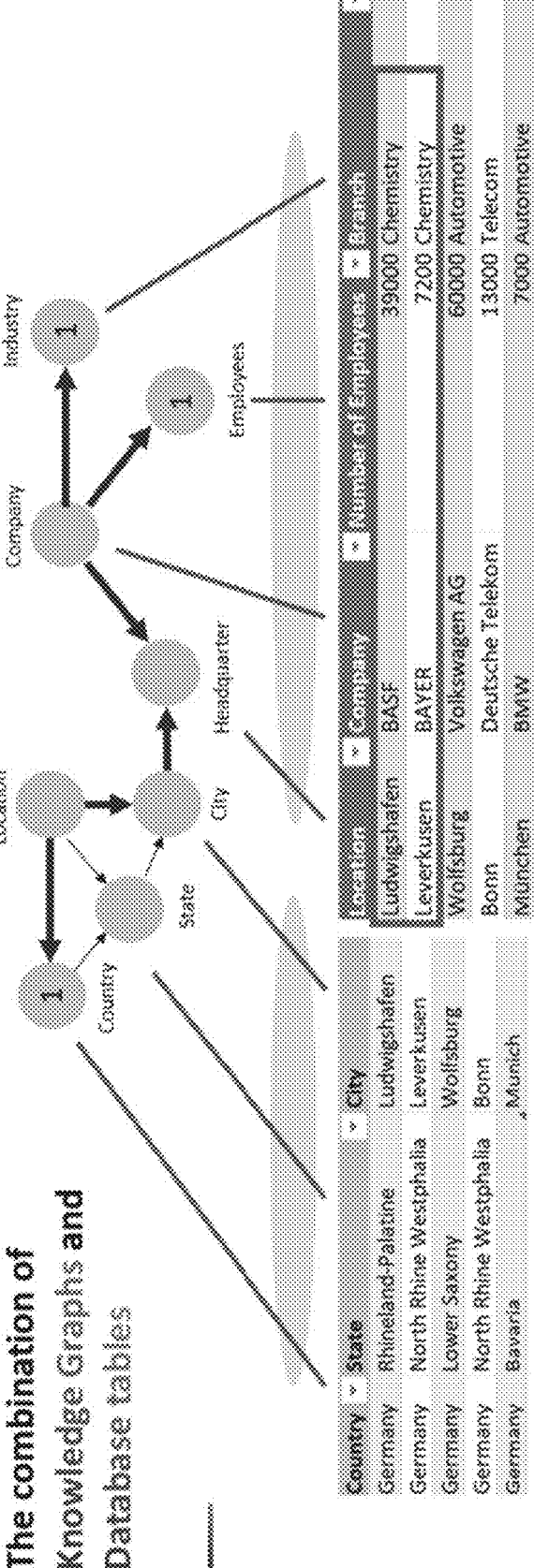
FIG. 3 illustrates a diagram of a portion of a knowledge graph, in accordance with some example implementations of the current subject matter.

Referring now to FIG. 3, a diagram of a portion of a knowledge graph 300 is shown, in accordance with one or more embodiments of the current subject matter. The discussion of knowledge graph 300 is intended to be a continuation of the discussion of knowledge graph 200 (of FIG. 2). In an example, three steps are identified for responding to the example semantic search: "How many employees work in the chemical industry in Germany?" These steps include (1) Identifying nodes and objects with references to the illustrated tables, (2) Identifying the shortest path between the nodes and objects, and (3) Generating an output. In other embodiments, other types of semantic searches may be processed in a similar manner.

Turning now to FIG. 4, a diagram of a portion of a neural network 400 is shown, in accordance with one or more embodiments of the current subject matter. AI systems may be based on neural networks in addition to knowledge graphs and other types of machine learning models. An example of a neural network 400 is shown in FIG. 4. As shown, neural network 400 includes an input layer, a hidden layer (i.e., process layer), and an output layer. Neural network 400 may also include any number of other hidden layers, as well as any number of neurons per layer although only 3 neurons are shown for the process layer. In an example, the input layer includes nodes $x_1$, $x_2$, and $x_3$ while the process layer includes neurons $y_1$, $y_2$, and $y_3$. The output layer includes nodes $z_1$ and $z_2$.

Coefficients $k_{11}$, $k_{12}$, $k_{13}$, $k_{21}$ $k_{22}$, $k_{23}$, $k_{31}$ $k_{32}$, and $k_{33}$ are shown in FIG. 4. For these coefficients, the first index number refers to the input node, and the second index number refers to the output neuron. The formulas for calculating the values of the neurons of the process layer are shown below the neural network diagram. It should be understood that FIG. 4 is merely meant to illustrate the relationships between coefficients, nodes, neurons, and adjacent layers of a neural network. Other neural networks may be structured differently with other numbers of layers and other numbers of neurons or nodes per layer.

As used herein, the term "coefficient" may be defined as a configurable value applied to the value of a neuron or node of a first layer in order to generate the value of a neuron or node of a second layer, where the second layer is connected to the first layer. The coefficients of a neural network are the values which are adjusted (i.e., trained) during training of the neural network.

Figure 5:
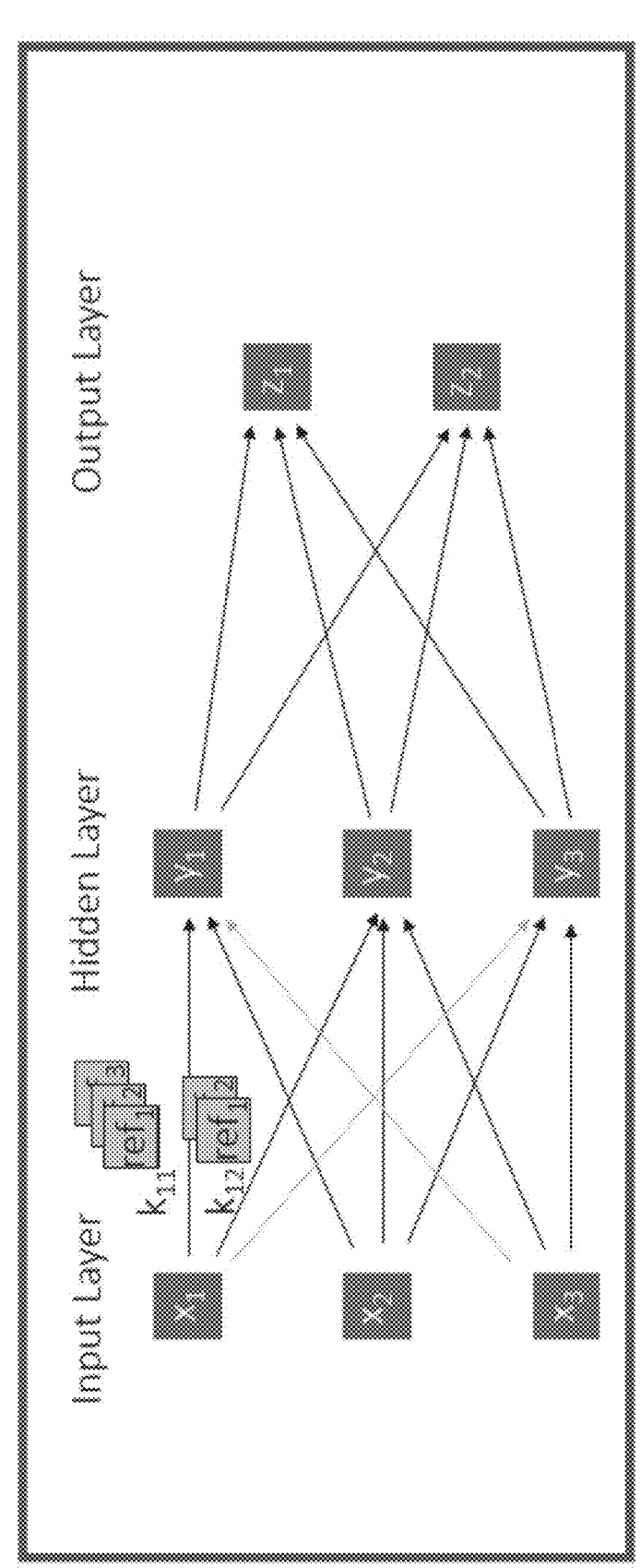
FIG. 5 illustrates a diagram of a portion of a neural network, in accordance with some example implementations of the current subject matter.

Referring now to FIG. 5, a diagram of a portion of a neural network 500 is shown, in accordance with one or more embodiments of the current subject matter. As shown in FIG. 5, neural network 500 includes an input layer, a hidden layer, and an output layer. Neural network 500 may also include any number of other hidden layers, as well as any number of neurons per layer although only 3 nodes and 3 neurons are shown for the input layer and the hidden layer, respectively.

Coefficients $k_{11}$ and $k_{12}$ are shown in FIG. 5 along with the relevant references. In an example, if a coefficient is changed by more than a given percentage (i.e., x %) by the training data, then a reference to the training data is stored at the coefficient. In other words, the reference to the training data is linked to the coefficient. It is noted that when referring to the coefficient being changed by more than a given percentage by the training data, this refers to a given training run with a given set of input data (i.e., input dataset). The given training run may refer to a forward pass (i.e., forward propagation) followed by a backward pass (i.e., backward propagation) through the neural network.

In another example, references to the training data for each training run may be saved as well as changes for all of the coefficients for each training run. After training, the references may be ranked and/or sorted according to the changes they caused to a given coefficient. For example, if there were 100 training runs, then the references may be ranked from 1 to 100 based on the changes they caused in the given coefficient. The ranking of references may be performed for each coefficient, with each coefficient having its own separate and independent ranking of references that is unique for the respective coefficient. The reference which caused the biggest change will be ranked #1, the reference which caused the second biggest change will be ranked #2, and so on. In a further example, only the reference which caused the biggest change will be saved for a given coefficient, rather than maintaining change data and references for all of the training runs. In a still further example, the reference which caused the biggest change in a positive direction will be saved for a given coefficient, and the reference which caused the biggest change in a negative direction will be saved for the given coefficient. In this example, two references will be save for each coefficient. Other techniques for determining which references and how many references to save for each coefficient are possible and are contemplated.

Figure 6:
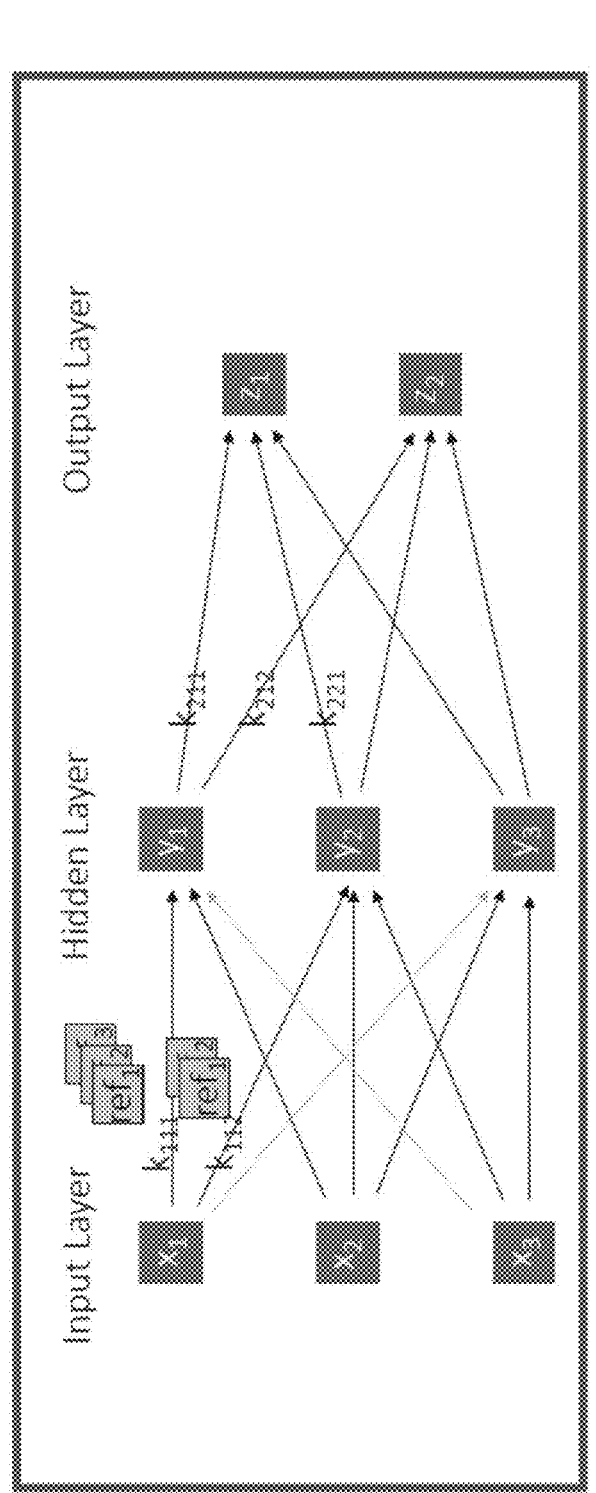
FIG. 6 illustrates a diagram of a portion of a neural network, in accordance with some example implementations of the current subject matter.

Turning now to FIG. 6, a diagram of a portion of a neural network 600 is shown, in accordance with one or more embodiments of the current subject matter. As shown in FIG. 6, neural network 600 includes an input layer, a hidden layer, and an output layer. Neural network 600 may also include any number of other hidden layers, as well as any number of nodes and neurons per layer although only 3 nodes/neurons are shown for the input layer and the hidden layer.

Coefficients $k_{111}$, $k_{112}$, $k_{211}$ $k_{212}$, and $k_{221}$ are also shown in FIG. 6. For these coefficients, the first index number identifies which layer the coefficient is part of, the second index number refers to the input node/neuron, and the third index number refers to the output node/neuron. In an example, if a coefficient is used to generate more than a threshold percentage (i.e., x %) of the result calculation, then a reference to the training data is saved for this coefficient. The value of the threshold percentage may vary from embodiment to embodiment.

Figure 7:
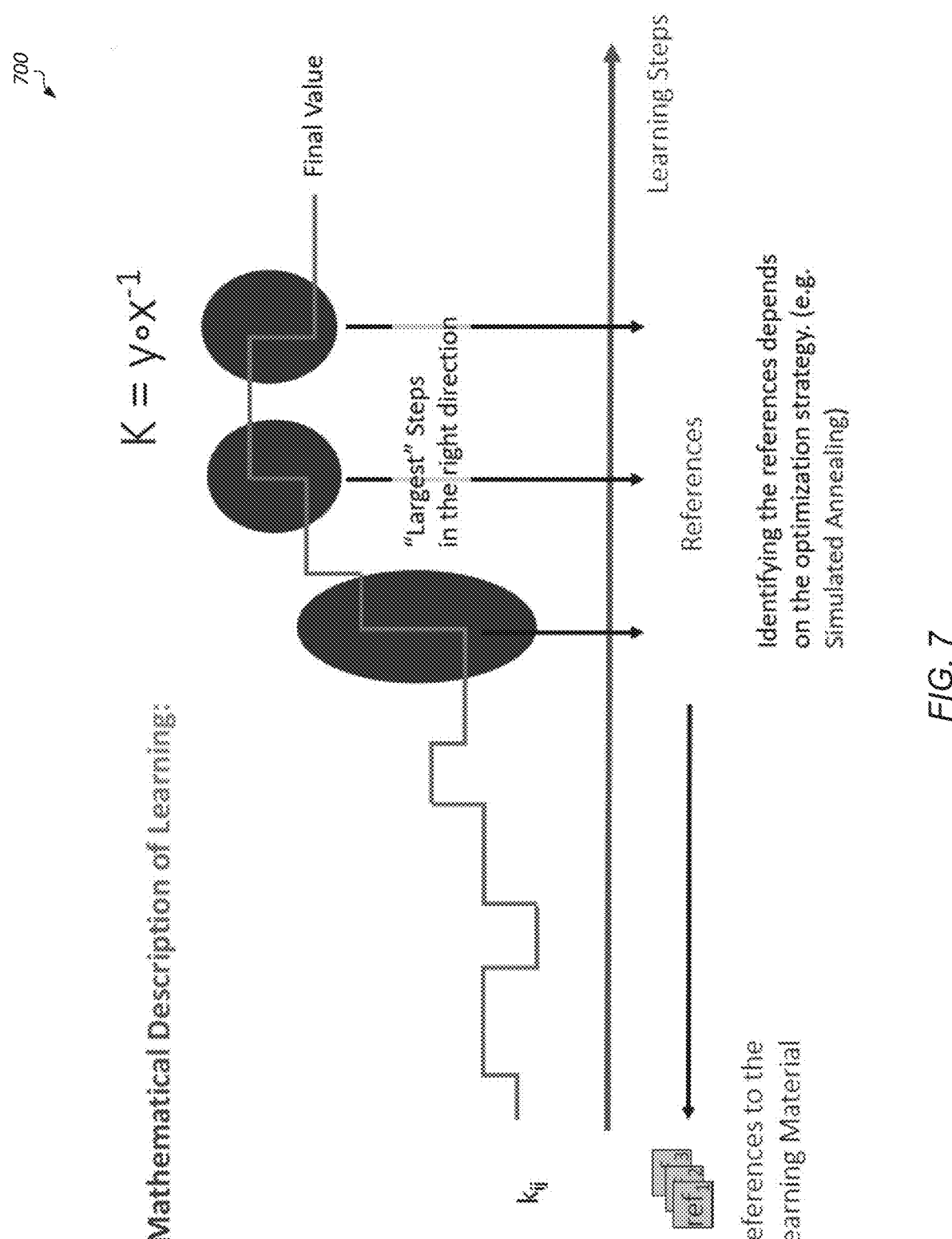
FIG. 7 illustrates a diagram of training steps for a given coefficient, in accordance with some example implementations of the current subject matter.

Referring now to FIG. 7, a diagram 700 of training steps for a given coefficient is shown, in accordance with one or more embodiments of the current subject matter. Diagram 700 illustrates an example of the training steps for a given coefficient $k_{ij}$. In diagram 700, the horizontal axis represents the different training runs of the neural network, while the vertical axis represents the changes in the value of given coefficient $k_{ij}$.

During training, the given coefficient $k_{ij}$ will be adjusted based on the specific training data being used to train the overall neural network. Each training run may use a different input dataset to train the neural network. When the given coefficient $k_{ij}$ makes the largest step in the right direction (i.e., correct direction), a reference to the learning material (i.e., input dataset and known output) that caused this largest step may be stored. In an example, the change in the given coefficient $k_{ij}$ during each training run is saved. Additionally, the specific training data (i.e., learning material) that was used to train the neural network during each run is saved. Then, at the end of training, the saved change data is searched to find the largest change to the given coefficient $k_{ij}$. Next, the corresponding training data that caused the largest change to the given coefficient $k_{ij}$ is identified. Then, a reference to this training data is saved.

In another example, during training, the largest steps in the positive direction and negative direction are saved. In this example, a largest positive step is maintained and a largest negative step is maintained for the given coefficient $k_{ij}$. For a given training run, the given coefficient $k_{ij}$ will be changed by a given amount. If the given amount is an increase in the given coefficient $k_{ij}$, then this given amount will be compared to the variable maintained for the largest movement in the positive direction. If the given amount is greater than the currently stored value being maintained for the largest movement in the positive direction, then the given amount will replace the currently stored positive movement value, and a reference to the specific training data that caused this change will be saved, replacing the previously stored reference. Alternatively, the top two references causing the two largest movements in the positive direction could be saved, the top three references could be saved, or some other number of references could be saved. On the other hand, if the given amount is a decrease in the given coefficient $k_{ij}$, then the given amount will be compared to the variable maintained for the largest movement in the negative direction. If the given amount exceeds the currently stored value, then the given amount will replace the currently stored negative movement value, and a reference to the specific training data that caused this change will be maintained.

It should be understood that these are merely examples of ways to determine which input datasets caused the largest positive and negative changes to the given coefficient $k_{ij}$. Other ways of determining which input datasets caused the largest change in the positive direction and the largest change in the negative direction for the given coefficient $k_{ij}$ and/or other ways of saving references to these input datasets are possible and are contemplated.

Figure 8:
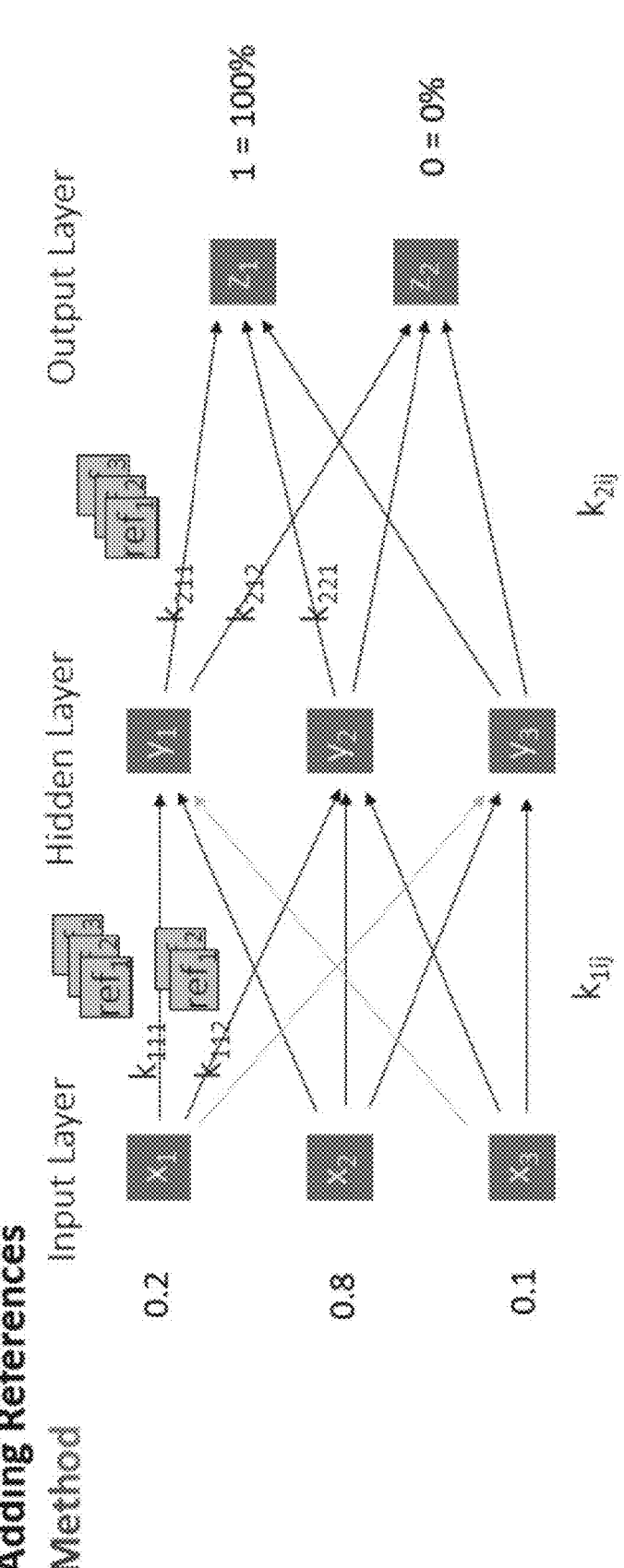
FIG. 8 illustrates a diagram of a portion of a neural network, in accordance with some example implementations of the current subject matter.

Turning now to FIG. 8, another diagram of a portion of a neural network 800 is shown, in accordance with one or more embodiments of the current subject matter. By default, each coefficient $k_{nij}$ in the layer "n" has a starting value. In an example, the starting value is a statistical value between 0 and 1. With each training step m, where the input vector $x_m$ and the output vector $z_m$ are known, the coefficients are optimized to improve the system. This step is named $training_m$. Each coefficient has a different value for each training step which may be represented mathematically as $k_{nij}(m)$. After the training phase, the coefficient will have the value $k_{nij}(m_{final}) = k_{nij}$. The step "m" which has the largest impact is added as a reference to the coefficients' reference list. This means that $training_m$ (with additional information such as input, supposed result, links to the source) is added to the coefficients' list of references. For example, as shown in FIG. 8, the input values for $x_1$, $x_2$, and $x_3$ are 0.2, 0.8, and 0.1, respectively. The supposed result is $z_1 = 1$ (100%) and $z_2 = 0$ (0%).

Usually the whole training phase has a number of runs with different starting values of the coefficients and the same set of training input (epoch). This allows for finding the global minimum of the optimization task. The references may be added to the coefficients in a final run where the result is known and the final value is known for each coefficient. Then the impact of each $training_m$ step is well known to the final result. The most important result(s) may be chosen as the values with the highest (and second highest, third highest, etc.) absolute value added to a coefficient in the direction to its final value. The most important result means that the delta between the current value and the final value after the training is getting smaller after the step and the step is the largest step of the epoch.

Using the gradient method to optimize the coefficients $k_{ij}$, the following formula may be used to calculate the new values $k_{ij}^*$:$k_{ij}^*$=$k_{ij}$+$\alpha dE/dk_{ij}$.

In the above formula, $a$ describes the training rate, which is usually a small number used to move in small steps to the optimum. E is the error function which is usually the difference between the current and the expected output multiplied with an attenuation function. $dE/dk_{ij}$ is a term which can influence the inserting of a reference. The final value of $k_{ij}$ is known and can be used to determine at which training step did the largest step to the correct final value of $k_{ij}$ occur. This training$_m$ step together with the $dE/dk_{ij}$ value are stored at the coefficient $k_{ij}$. To identify the largest step during a run, a larger value of $dE/dk_{ij}$ can be identified using the stored value at a coefficient and then the reference can be replaced. Any other optimization method for the training leads to a different weighting and can be taken into account by adjusting the example of the above gradient method.

Figure 9:
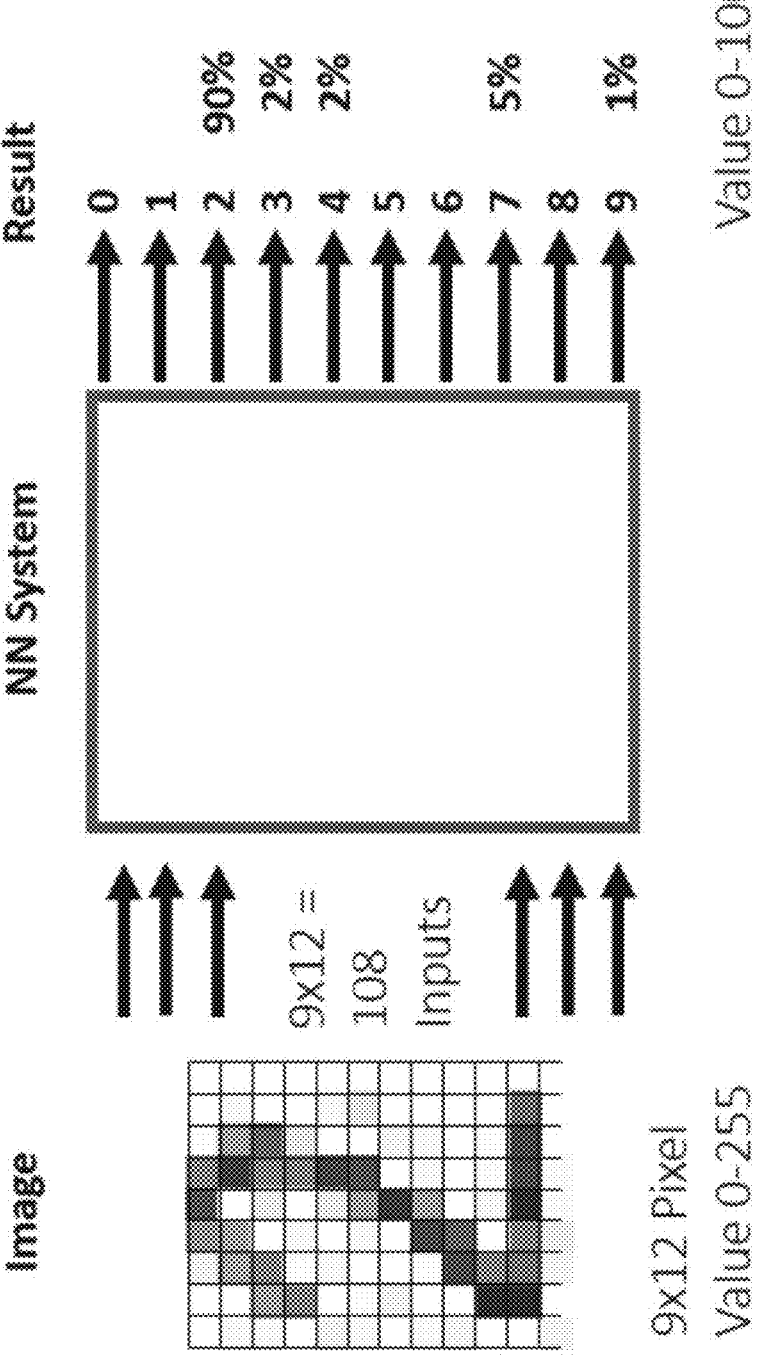
FIG. 9 illustrates a diagram of a trained neural network processing an image, in accordance with some example implementations of the current subject matter.

Referring now to FIG. 9, a diagram of a trained neural network processing an image is shown, in accordance with one or more embodiments of the current subject matter. As shown in FIG. 9, a 9×12 pixel value (with value range 0-255) is input into the trained neural network, and the result is a selection of one of the digits 0-9. The result may be generated by the trained neural network with a specified confidence percentage. In the example shown in FIG. 9, the result of 2 has a 90% confidence, the result of 3 has a 2% confidence, the result of 4 has a 2% confidence, the result of 7 has a 5% confidence, and the result of 9 has a 1% confidence. It should be understood that these results are merely illustrative of one particular embodiment. Other results may be generated by other trained neural networks processing other images or other types of input datasets.

Figure 10:
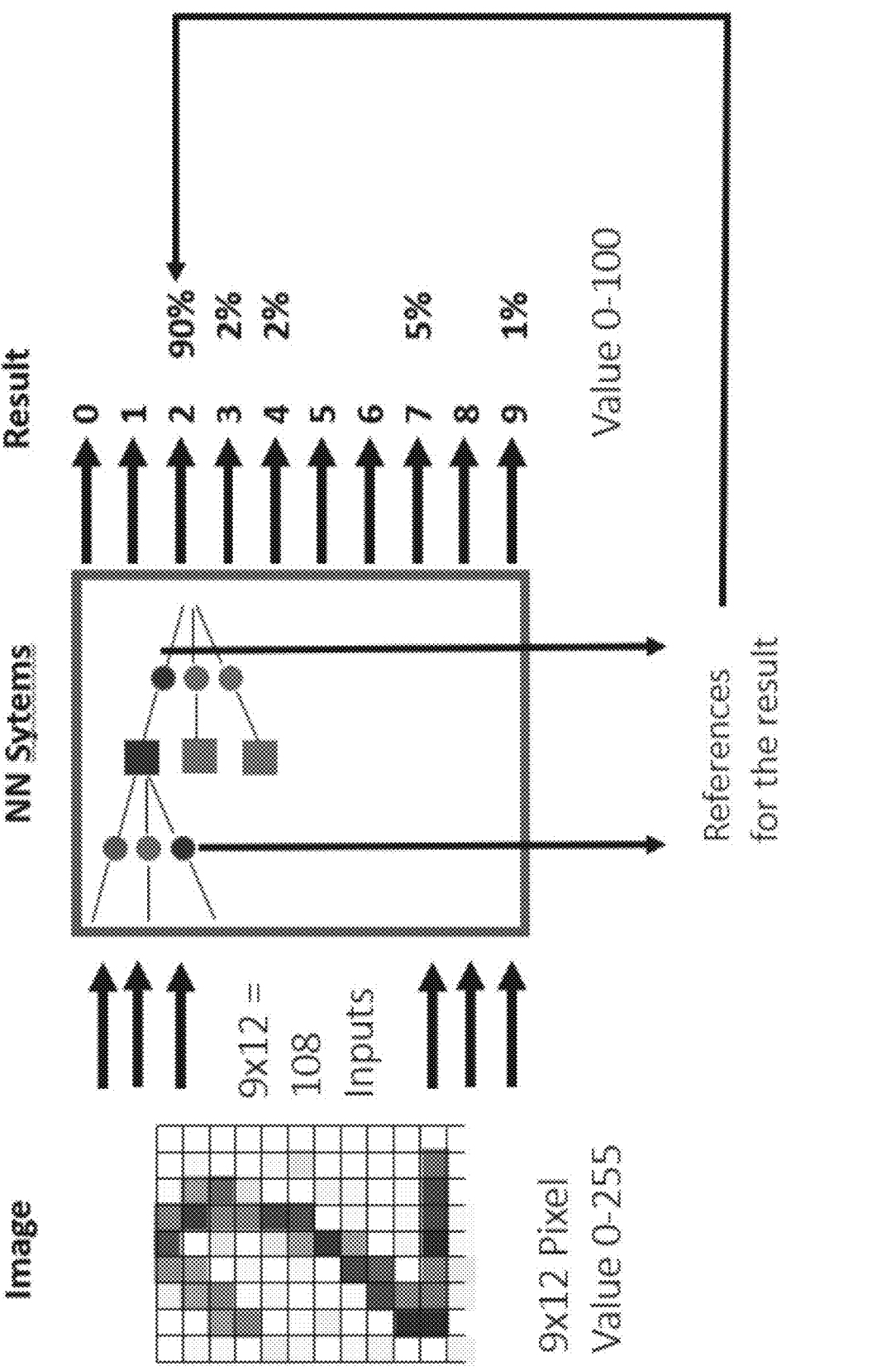
FIG. 10 illustrates another diagram of a trained neural network processing an image, in accordance with some example implementations of the current subject matter.

Turning now to FIG. 10, another diagram of a trained neural network processing an image is shown, in accordance with one or more embodiments of the current subject matter. FIG. 10 is intended to illustrate a continuation of the discussion of FIG. 9. Once the result with the highest confidence is identified, which in this case is the result of 2 with a 90% confidence, the path backward through the trained neural network can be tracked from this result. Each node having a highest value traveling backward from the 90% confidence result is identified, and the coefficients of each node are identified. Then, the references stored for these coefficients are collected, as shown with the arrows downward out of the trained neural network. These references may be stored using any of the previously discussed techniques.

Referring now to FIG. 11, a diagram of a portion of a trained neural network 1100 is shown, in accordance with one or more embodiments of the current subject matter. As shown for trained neural network 1100, the output $z_1$ has a calculated result of 0.9 or 90% and the output $z_2$ has a calculated result of 0.1 or 10%. This is merely illustrative of one particular embodiment for the purposes of this discussion. In an example, a backtracking engine (e.g., backtracking engine 147 of FIG. 1) may be configured to identify the references which are most important for the result of network 1100.

To calculate the list of references which are most important for the result, the path backward through trained neural network 1100 which has the most impact on the result is traversed. For example, the path backward starts with the highest result value which in this case is $z_1$ with 90%. Then, the backtracking engine determines the highest value that was added to this result. In this case, the highest value added to $z_1$ is calculated to be 0.8, which is product of the $y_2$ value multiplied by coefficient $k_{221}$. The processor then traverses this path backward to the $y_2$ node and collects the reference(s) identified for coefficient $k_{221}$. At the $y_2$ node, a similar decision is made to identify the highest value which is added to create the $y_2$ value. The processor may then collect reference(s) identified for the coefficient(s) on the identified path. The processor may continue to traverse the path backward through trained neural network 1100 until either some intermediate hidden layer is reached or until the input layer is reached. The number of layers that are traversed on the backward path while collecting references may be a configurable value, or may be based on the value of the result being e.g., above a threshold.

Figure 12:
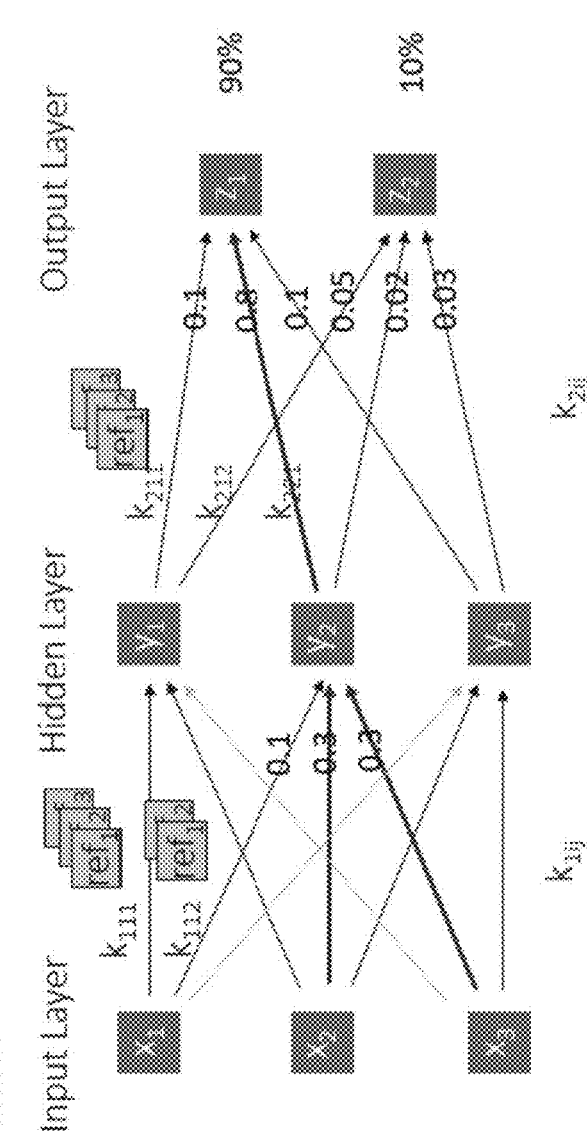
FIG. 12 illustrates another diagram of a portion of a trained neural network, in accordance with some example implementations of the current subject matter.

Turning now to FIG. 12, another diagram of a portion of a trained neural network 1200 is shown, in accordance with one or more embodiments of the current subject matter. The discussion of trained neural network 1200 of FIG. 12 is intended to be a continuation of the discussion of trained neural network 1100 of FIG. 11. As previously discussed in regard to trained neural network 1100 of FIG. 11, the result $z_1$ is dominated by the contribution of $k_{221}^*y_2$=0.8. This is the highest value added to the $z_1$ value, and therefore the reference ref$_{221}$, corresponding to coefficient $k_{221}$, is added to the reference list.

Continuing to traverse backward through trained neural network 1200 from node $y_2$, it is determined that two equal values of 0.3 have been combined to create the value for the node $y_2$. Therefore, in this case, since two paths have equal value that contributed to the value for the node $y_2$, the references ref$_{122}$ and ref$_{132}$ for the coefficients of these two paths are added to the reference list. The path backward through trained neural network 1200 may continue through any number of layers, with references being collected for coefficients along the backward traversal and added to the list of references.

In an example, the reference collection traversal of a path backward through trained neural network 1200 may be terminated if the product of a coefficient multiplied by the corresponding value is below a threshold. For example, if the threshold was 33%, then the traversal would stop at $y_2$ since the biggest contribution to $y_2$ from any single path is 0.3 and below the threshold. In another example, the reference collection traversal of the path backward through trained neural network 1200 may be terminated if the path has to be split because the highest contribution value is shared equally among multiple paths. In other examples, other criteria for terminating the reference collection traversal of the path backward through trained neural network 1200 may be employed.

Figure 13:
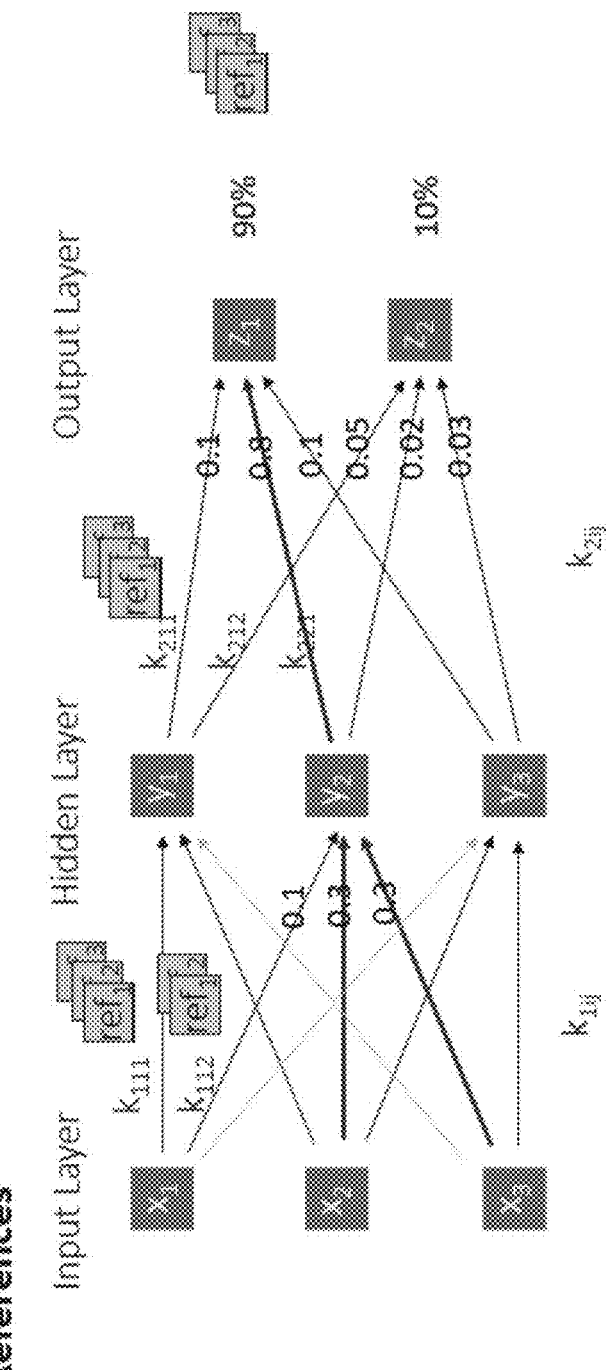
FIG. 13 illustrates another diagram of a portion of a trained neural network, in accordance with some example implementations of the current subject matter.

Referring now to FIG. 13, another diagram of a portion of a trained neural network 1300 is shown, in accordance with one or more embodiments of the current subject matter. The discussion of trained neural network 1300 of FIG. 13 is intended to be a continuation of the discussion of trained neural network 1200 of FIG. 12. As a result of the reference collection traversal of the path backward through trained neural network 1300, a list of references most impactful to the end result have been collected. This list of references may be utilized in a variety of ways. For example, the list of references may be presented to a user in a graphical user interface (GUI), the list of references may be used to train one or more other neural networks, the list of references may be used to retrain neural network 1300, and so on.

In an example, an incorrect result may be generated by a given neural network. In this example, a list of references may be collected along the backward path most impactful to the incorrect result generated by the given neural network.

Accordingly, after this list of references is collected, the list of references may be removed from the training set that is used to train subsequent neural networks. Additionally, a new, truncated training set that omits this list of references may be used to retrain the given neural network that generated the incorrect result. Other ways of using the list of references collected according to the techniques presented herein are possible and are contemplated.

Referring now to FIG. 14, a process is depicted for generating a list of references most impactful to an output of a trained machine learning model, in accordance with one or more embodiments of the current subject matter. A trained machine learning model generates an output for a given input set of data, where the output includes a plurality of results (block 1405). In one implementation, the trained machine learning model is a trained neural network. In other implementation, the trained machine learning model is any of various other types of trained artificial intelligence models (e.g., large language models, inference engines, generative pre-trained transformers, generative adversarial networks). An example of an output being generated by a trained machine learning model is shown in FIG. 9. The output generated as shown in FIG. 9 includes results 2, 3, 4, 7, and 9 and corresponding result values 90%, 2%, 2%, 5%, and 1%, respectively. The result values may also be referred to as scores, percentages, likelihoods, confidence indicators, and so on. Other examples of outputs being generated by a trained machine learning model are shown in FIG. 8 and FIG. 11.

Next, a result with the highest value from the output is identified (block 1410). In the example of FIG. 9, the result of 2 has the highest value (90%). Then, the backward path from the result node (i.e., the node corresponding to the result identified in block 1410) through the trained machine learning model to the previous layer which adds the greatest value to the result node is identified (block 1415). If multiple backward paths add equal values which are greater than any other backward paths, then these multiple paths may be identified in block 1415. Next, the coefficient(s) for this backward path are identified and references corresponding to these coefficient(s) are collected and added to a list of references (block 1420). It is assumed for the purposes of this discussion that references have already been collected for the coefficients during training of the trained machine learning model. Examples of methods that may be performed in order to collect references for the coefficients during training are described throughout this disclosure. Any suitable technique for collecting references for the coefficients during training may be utilized.

After block 1420, the backward path which adds the greatest value to the current node is identified (block 1425). For example, the layers of the trained machine learning model may be labeled in a forward direction from 1 to N, where N is a positive integer greater than one, with the input layer labeled "1" and the output layer labeled "N". In this example, on the first pass through method 1400, the backward path from layer "N–1" to layer "N–2" is traversed in block 1425, with the coefficient and value from the node in layer "N–2" contributing the greatest value to the node in layer "N–1" being identified.

Next, after block 1425, if the value contribution of this backward path is greater than a threshold (conditional block 1430, "yes" leg), then method 1400 returns to block 1420 where the coefficient(s) for this backward path are identified and references corresponding to these coefficient(s) are collected and added to the list of references. The list of references may include at least those references identified for layer "N–1" and layer "N–2". Otherwise, if the value contribution of this backward path is less than or equal to the threshold (conditional block 1430, "no" leg), then the backward path traversal is terminated and the list of references is finalized (block 1435). When the list of references is finalized, this indicates that the list of references is in its final state. In other words, no more references will be added to the list of references. Finalizing the list of references may involve storing the list of references and linking or associating the list of references with the given input set of data. Additionally or alternatively, if multiple paths share an equal contribution to the current path node, then the "no" leg may be taken out of conditional block 1430, regardless of the result of the comparison of the value contribution to the threshold. Additionally or alternatively, if the input layer has been reached during the traversal of the backward path, then the "no" leg may be taken out of conditional block 1430.

Next, after block 1435, the final list of references is provided to one or more applications to perform one or more actions (block 1440). For example, the one or more applications may retrain the machine learning model and/or train one or more other machine learning models based at least on the final list of references. In another example, one or more of the input datasets corresponding to one or more references in the final list of references may be removed from one or more training sets of data, where the one or more training sets of data are used to train one or more machine learning models. In a further example, one or more of the input datasets corresponding to one or more references in the final list of references may be added to one or more training sets of data, where the one or more training sets of data are used to train one or more machine learning models. Other types of actions being performed by the one or more applications in block 1450 are possible and are contemplated.

Referring now to FIG. 15, a process is depicted for determining which references to store during training, in accordance with one or more embodiments of the current subject matter. A training engine (e.g., training engine 145 of FIG. 1) initiates training of a machine learning model (e.g., machine learning model 150A of FIG. 1) (block 1505). The training of the machine learning model may include a plurality of individual training runs. The number of training runs in the overall training may vary from machine learning model to machine learning model. During training, the training engine tracks changes that are made to the coefficients of the layers of the machine learning model (block 1510). The training engine stores references to input datasets causing the largest changes to the coefficients of the layers of the machine learning model (block 1515). When training is complete, the training engine finalizes and publishes the list of references for the coefficients of the layers of the machine learning model (block 1520). In an example, finalizing and publishing the list of references may involve attaching the list of references to the machine learning model such that the list and the machine learning model are linked together. For future uses of the machine learning model, the list of references may be retrieved and utilized for determining which input datasets made a greatest contribution to a given output result generated by the machine learning model. After block 1520, method 1500 may end.

Figure 16:
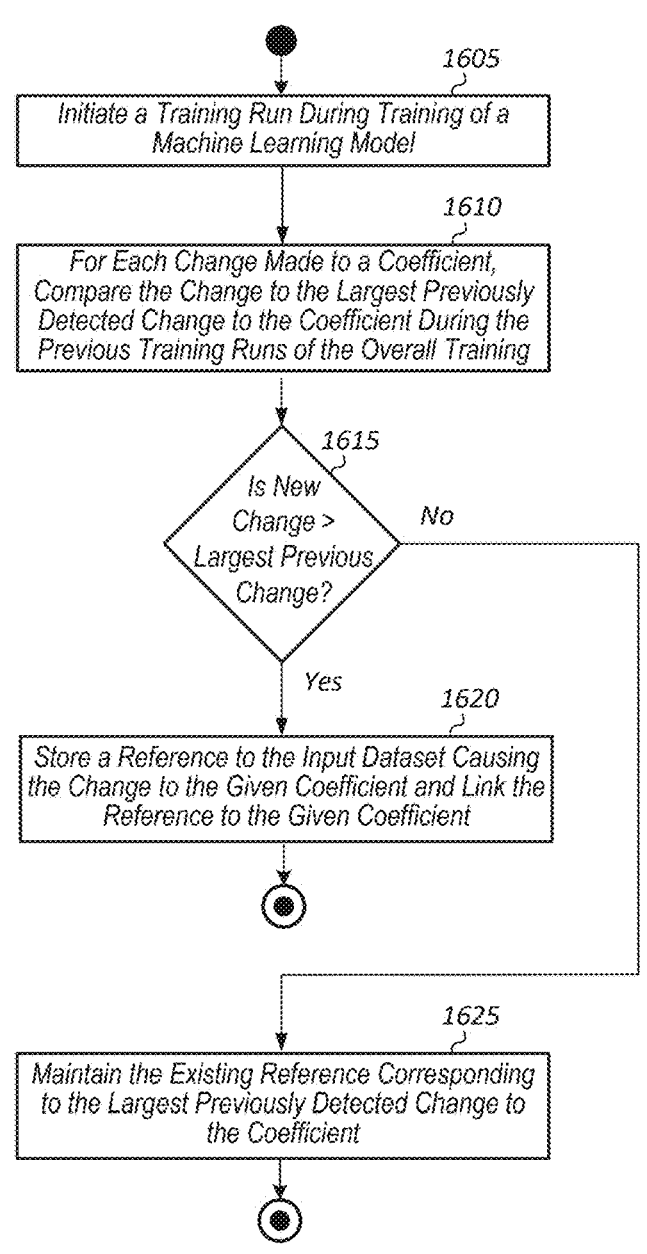
FIG. 16 illustrates an example of a process for determining which references to store during training, in accordance with some example implementations of the current subject matter.

Turning now to FIG. 16, a process is depicted for determining which references to store during training, in accordance with one or more embodiments of the current subject matter. A training engine (e.g., training engine 145 of FIG. 1) initiates a training run during training of a machine learning model (e.g., machine learning model 150A of FIG. 1) (block 1605). The training run may be performed with a given input dataset. The given input dataset may be part of an overall training dataset. Next, for each change made to a coefficient during the training run, the training engine compares the change to the largest previously detected change to the coefficient during the previous training runs of the overall training (block 1610). If the change is greater than the largest previously detected change (conditional block 1615, "yes" leg), then the training engine stores a reference to the given input dataset causing the change to the given coefficient, and the training engine links the reference with the given coefficient (block 1620). This reference to the given input dataset may replace the previously stored reference to the earlier change which had been the largest detected change up until the current training run.

Otherwise, if the change is less than or equal to the largest previously detected change (conditional block 1615, "no" leg), then the training engine maintains the existing reference corresponding to the largest previously detected change to the coefficient (block 1625). After blocks 1620 and 1625, method 1600 may end. It is noted that conditional block 1615 may be performed for a plurality of coefficients of a plurality of layers of the machine learning model.

Referring now to FIG. 17, a process is depicted for determining which references to store during training, in accordance with one or more embodiments of the current subject matter. A training engine (e.g., training engine 145 of FIG. 1) initiates a training run during training of a machine learning model (e.g., machine learning model 150A of FIG. 1) (block 1705). The training run may be performed with a given input dataset. The given input dataset may be part of an overall training dataset. Next, for each change made to a coefficient during the training run, the training engine compares the change to a threshold (block 1710). If the change is greater than the threshold (conditional block 1715, "yes" leg), then the training engine stores a reference to the given input dataset causing the change to the given coefficient, and the training engine links the reference with the given coefficient (block 1720). In an example, the training engine stores a given identifier of the given coefficient and links the given identifier to the given input dataset. In another example, the training engine stores a given identifier of the given input dataset and links the given identifier to the given coefficient.

Otherwise, if the change is less than or equal to the threshold (conditional block 1715, "no" leg), then the training engine does not store a reference to the given input dataset causing the change (block 1725). In other words, the training engine skips over this given coefficient since the change was not large enough to be material to the overall training of the machine learning model. After blocks 1720 and 1725, method 1700 may end. It is noted that conditional block 1715 may be performed for a plurality of coefficients of a plurality of layers of the machine learning model.

Turning now to FIG. 18, a process is depicted for determining a cause of a machine learning engine generating an incorrect result, in accordance with one or more embodiments of the current subject matter. A training engine (e.g., training engine 145 of FIG. 1) initiates training of a machine learning model with a training dataset, where the machine learning model includes a plurality of layers (block 1805). During training, the training engine monitors values of a plurality of coefficients of one or more layers of the machine learning model (block 1810). The training engine stores a given reference to a given input dataset in response to detecting a learning step greater than a threshold for a given coefficient (block 1815). The value of the threshold may vary from embodiment to embodiment. In an example, the threshold may be the value of the largest previously detected learning step for the given coefficient. In this example, the training engine tracks the largest previously detected learning step for each coefficient of the plurality of coefficients of the one or more layers of the machine learning model. In other examples, other techniques for setting the value of the threshold may be utilized. It is noted that the training engine may store references for multiple coefficients in block 1815 if the learning steps of multiple different coefficients are greater than corresponding thresholds.

When training is complete, if an output error (i.e., incorrect result) is detected for the trained machine learning model, a backtracking engine (e.g., backtracking engine 147 of FIG. 1) backtracks through the trained machine learning model on a backward path which provides a largest contribution to the output error (block 1820). The backtracking engine retrieves the given reference if the given coefficient is traversed on the backward path through the trained machine learning model (block 1825). It is noted that in block 1825, the backtracking engine may also retrieve a plurality of other references for other coefficients which are astride (i.e., situated on) the backward path through the trained machine learning model. In some cases, the backtracking engine may identify the most important contributors among the plurality of references based on the size of the learning steps for each coefficient along the backward path. In other words, the backtracking engine may compare the sizes of the learning steps for the coefficients and then select the references corresponding to those coefficients that had the largest learning steps among the plurality of coefficients located on the backward path identified in block 1820. In other examples, the backtracking engine may collect all of the references along the backward path in block 1825 without comparing the sizes of learning steps for the coefficients on the backward path.

After block 1825, the backtracking engine may provide, to a software application (e.g., application 125A of FIG. 1), the given reference to the given input dataset, where the software application is analyzing the machine learning model to determine a cause of the output error (block 1830). The backtracking engine may also provide, to the software applications, other references to other input datasets based on the coefficients which are traversed along the backward path. After block 1830, method 1800 may end.

Referring now to FIG. 19, a process is depicted for determining pertinent references for a trained machine learning model, in accordance with one or more embodiments of the current subject matter. An output is generated by a trained machine learning model (block 1905). In an example, the trained machine learning model is a neural network. In other examples, the trained machine learning model is any of various other types of machine learning models besides a neural network. Next, a backtracking engine (e.g., backtracking engine 147 of FIG. 1) determines a given output node, out of a plurality of output nodes, with a highest value (block 1910). Then, the backtracking engine backtracks from the given output node through the trained machine learning model along the path(s) providing the largest contribution(s) to the given output node (block 1915). One example of a process for backtracking through the trained machine learning model is described in FIG. 14 for method 1400. It is noted that the backtracking in block 1915 is performed in the direction toward the input layer and away from the output layer. In an example, the relevant portion of method 1400 may be employed to implement block 1915 so as to backtrack through the trained machine learning model.

During the backtracking, the backtracking engine collects references for the coefficients along the path(s) backward through the trained neural network (block 1920). Then, the backtracking engine causes one or more operations to be performed based on the collected references (block 1925). Depending on the embodiment, the one or more operations may include presenting a list of the collected references in a graphical user interface to a user, truncating a training set of references based on the collected references, retraining the machine learning model based on the collected references or based on the truncated training set, training one or more other machine learning models based on the collected references or based on the truncated training set, and/or other operations. After block 1925, method 1900 may end.

Turning now to FIG. 20, a process is depicted for responding to a machine learning engine generating an incorrect result, in accordance with one or more embodiments of the current subject matter. A traceability engine (e.g., backtracking engine 147 of FIG. 1) detects and/or receives an indication of a trained machine learning engine (e.g., machine learning model 150A) generating an incorrect result as an output (block 2005). In response to the indication, the traceability engine backtracks through the trained machine learning engine and identifies a backward path providing a largest contribution to the incorrect output (i.e., erroneous output) (block 2010). The traceability engine identifies coefficients in the layers of the trained machine learning engine located on the backward path (block 2015). Then, the traceability engine retrieves references corresponding to the identified coefficients (block 2020). Next, the traceability engine generates, in a GUI, indications identifying the input datasets, corresponding to the retrieved references, as likely causes of the incorrect output (block 2025). The traceability engine may also generate, in the GUI, one or more graphical elements, which when selected by a user, cause one or more actions to be taken based on the identified input datasets (block 2030). These actions may include generating view(s) of one or more of the identified input datasets, analyzing the identified input datasets, and so on. Also, the traceability engine generates a new training dataset by removing the input datasets identified as causing the erroneous output (block 2035). Next, a training engine (e.g., training engine 145 of FIG. 1) retrains the machine learning engine with the new, truncated training dataset after the identified input datasets have been removed (block 2040). The training engine also trains one or more other machine learning models with the new, truncated training dataset without the identified input datasets (block 2045). After block 2045, method 2000 ends.

Referring now to FIG. 21, a diagram of a portion of a neural network 2100 is shown, in accordance with one or more embodiments of the current subject matter. As shown in FIG. 21, neural network 2100 includes an input layer, a hidden layer, and an output layer. Neural network 2100 may also include any number of other hidden layers, as well as any number of nodes and neurons per layer although only three nodes/neurons are shown for the input layer and the hidden layer and two nodes are shown for the output layer. Also, there may be any number of relations between the nodes/neurons.

In an example, a base neural network 2100 may be trained with a training dataset, where the training dataset consists of a number P of input datasets. After the training of the base neural network 2100, a separate reference neural network may be trained using values generated by a given layer of base neural network 2100 for each input dataset of the P input datasets of the training dataset. The separate reference neural network will have P outputs, with the P outputs corresponding to the P input datasets used to train the base neural network 2100.

In an example, assuming the value of P is 1000, and assuming that the base neural network 2100 is trained to differentiate between images of cats and dogs, each input dataset of the 1000 input datasets is an image of a cat or a dog. In this example, a given layer of the base neural network 2100 is chosen. For the purposes of this discussion, it will be assumed that the hidden layer shown in FIG. 21 is chosen, with this hidden layer having nodes $y_1$, $y_2$, and $y_3$. For the processing of each input dataset (i.e., each image of a cat or dog) by the trained base neural network 2100, the intermediate values propagated from the hidden layer to the output layer are retrieved and/or saved. These intermediate values correspond to the value of $y_1$ node multiplied by the coefficient $k_{211}$, the value of $y_1$ node multiplied by the coefficient $k_{212}$, the value of $y_2$ node multiplied by the coefficient $k_{221}$, the value of $y_2$ node multiplied by the coefficient $k_{222}$, the value of $y_3$ node multiplied by the coefficient $k_{231}$, and the value of $y_3$ node multiplied by the coefficient $k_{232}$. It is noted that the coefficients which are multiplied by the value of each node refer to the coefficients of the trained base neural network 2100. In this case, there are six intermediate values from the hidden layer which are retrieved and/or recorded. In other examples, with other numbers of nodes for the chosen layer, there may be other numbers of intermediate values which are retrieved and/or saved.

This set of intermediate values are then provided as an input to train the reference neural network for the hidden layer. The known output for the training of the reference neural network is the particular input dataset (i.e., the image of the cat or dog) which caused the base neural network 2100 to generate the set of intermediate values from the hidden layer to be propagated to the output layer. Assuming that there are a total of 1000 input datasets in the training dataset for the base neural network 2100, the reference neural network will have 1000 output nodes in this example. Therefore, the known output for the training of the reference neural network is a value of 1 for the output node corresponding to the particular input dataset and a value of 0 for all other output nodes corresponding to the other 999 input datasets of the training dataset. The training of the reference neural network will continue for all other 999 input datasets in a similar fashion to the training described above. At the conclusion of training, the result will be a trained reference neural network which is associated with the base neural network 2100.

Next, the base neural network 2100 may process a new input dataset (i.e., an image of a cat or dog), with the new input dataset not being a part of the original training dataset. The base neural network 2100 will generate an output result which indicates whether the new input dataset is a cat or a dog. The intermediate values from the hidden layer of the base neural network 2100 which are generated when processing this new input dataset may also be provided as an input to the trained reference neural network. The output result generated by the trained reference neural network, based on the intermediate values from the hidden layer of the base neural network 2100 which are generated when processing this new input dataset, will indicate which input dataset from the training dataset most closely resembles this new input dataset. In other words, in the previously described example, the output from the trained reference neural network will indicate which image of a cat or dog from the training dataset is a closest match to this new image of a cat or dog.

Additionally, while the reference neural network is described as being trained by the intermediate values generated by a particular layer of base neural network 2100, it should be understood that multiple different reference neural networks may be used in some embodiments. For example, when a base neural network has multiple hidden layers, a different reference neural network may be employed for each hidden layer. For instance, if a base neural network has 10 hidden layers, then 10 different reference neural networks may be employed, with each reference neural network trained by a set of intermediate values generated by a particular hidden layer. In some cases, only a portion or subset of the hidden layers of the base neural network may have a corresponding reference neural network. For example, in the case where a base neural network has 10 hidden layers, then 5 different reference neural networks may be employed, with every other hidden layer being assigned a corresponding reference neural network. It should be understood that other ratios of reference neural networks to numbers of hidden layers of the base neural network may be employed in other embodiments. Additionally, in further embodiments, a single reference neural network may be trained using intermediate values generated by two or more hidden layers from a base neural network. Generally speaking, any pattern or constellation of nodes scattered throughout a base neural network may be chosen, and the intermediate values generated by this pattern or constellation of nodes may be used to train a given reference neural network. The example of using intermediate values generated by a single layer was meant merely to serve as example for the purposes of explanation and is not meant to limit the scope of these techniques.

Figure 22:
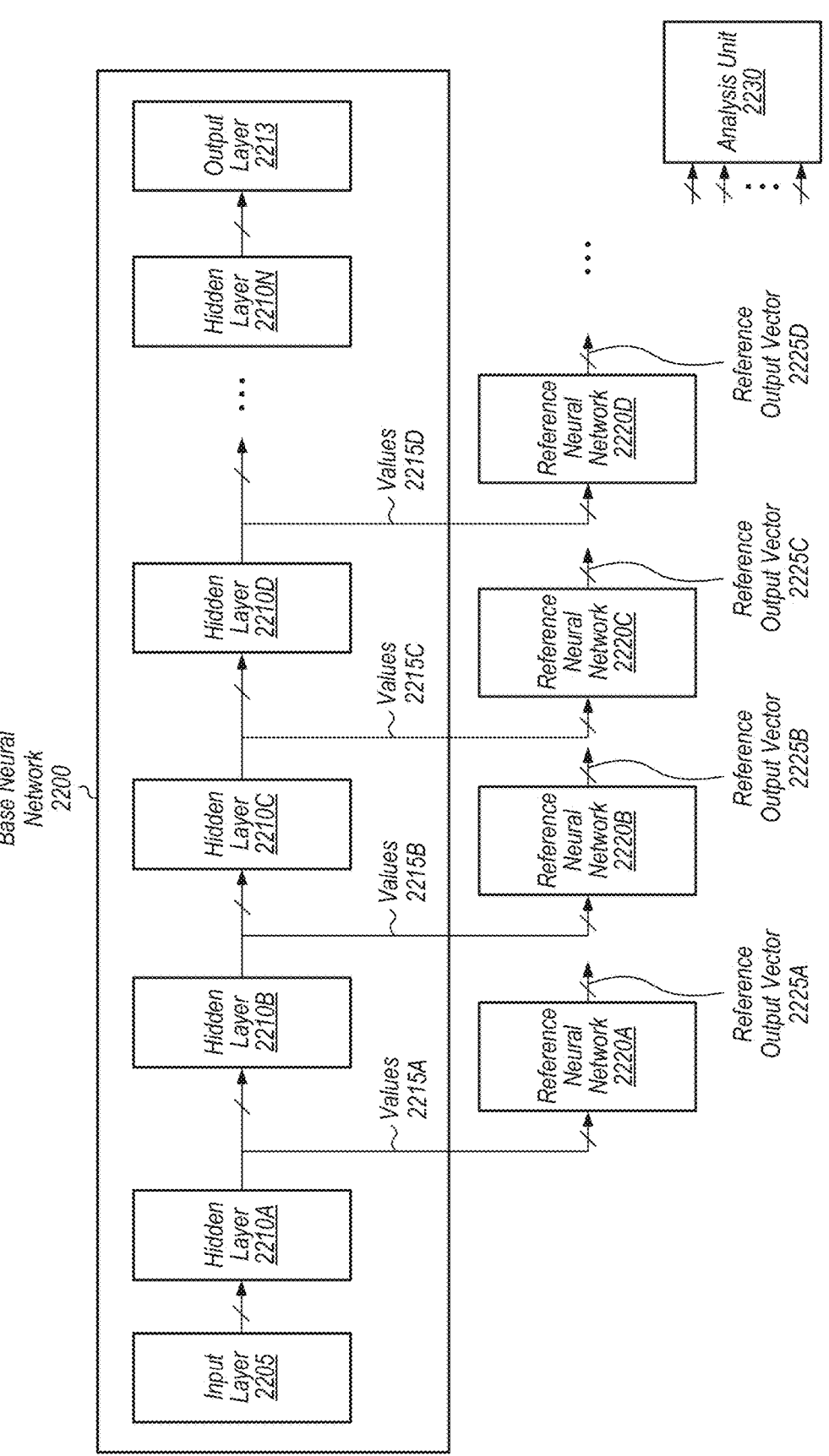
FIG. 22 illustrates a block diagram of a base neural network and corresponding reference neural networks, in accordance with some example implementations of the current subject matter.

Turning now to FIG. 22, a block diagram of a base neural network 2200 and corresponding reference neural networks 2220A-D are shown, in accordance with one or more embodiments of the current subject matter. Base neural network 2200 represents any type of neural network or machine learning model which includes an input layer 2205, hidden layers 2210A-N, and output layer 2213. Hidden layers 2210A-N are representative of any number and type of layers (e.g., convolutional, ReLU, activation, pooling, fully connected, batch normalization). Base neural network 2200 is trained with a training dataset to generate a trained version of base neural network 2200.

After training, the input datasets that were used to train base neural network 2200 are once again processed by the trained version of base neural network 2200. For each input dataset, the values 2215A-D from a plurality of hidden layers 2210A-D are provided as inputs to train corresponding reference neural networks 2220A-D. For example, if the training dataset has 100 input datasets, then each reference neural network 2220A-D will have 100 outputs in each reference output vector 2225A-D, with a separate output value for each possible input dataset. For the first input dataset, the known output for each reference output vector 2225A-D will be a value of 1 for the output corresponding to the first input dataset and a value of 0 for all other outputs. The values 2215A-D that are coupled from hidden layers 2210A-D to reference neural networks 2220A-D are the values that are propagated from one hidden layer to the next hidden layer within base neural network 2200. For example, each value of values 2215A is a product of a node value and a corresponding coefficient.

Reference neural networks 2220A-D will be trained with the values 2215A-D that are generated by hidden layers 2210A-D, respectively, for each input dataset of the overall training dataset that was used to train base neural network 2200. After training is complete for reference neural networks 2220A-D, the trained versions of reference neural networks 2220A-D may be used in cooperation with the trained version of base neural network 2200. For example, when a new, non-training input dataset is processed by the trained version of base neural network 2200, each trained version of reference neural network 2220A-D will generate a corresponding reference output vector 2225A-D which identifies which of the training input datasets most closely resembles (i.e., is the closest match to) the new, non-training input dataset. A union of reference output vectors 2225A-D may be created by combining together the outputs of all reference neural networks 2220A-D. This union may generate a ranking of the training input datasets to rank them in terms of their resemblance to the new, non-training input dataset being processed.

During training, values 2215A-D and reference output vectors 2225A-D may be provided to an analysis unit 2230 to optimize base neural network 2200 by determining how many coefficients are needed, how many layers are the optimum, and so on. For example, if certain values of values 2215A-D are close to zero for some threshold percentage of the training dataset, this may indicate that the corresponding coefficients are inconsequential and/or not needed, and these coefficients may be removed from base neural network 2200. Additionally, if a particular reference output vector of reference output vector 2225A-D is an outlier, such that it is not closely correlated with the other reference output vectors, this may indicate that the corresponding hidden layer of hidden layers 2210A-N may be removed from base neural network 2200. Other types of determinations may be made by analysis unit 2230 based on values 2215A-D and reference output vectors 2225A-D which may result in base neural network 2200 being optimized. It is noted that the analysis unit 2230 may be implemented using any suitable combination of hardware (e.g., processing unit(s), circuitry) and/or software (e.g., program instructions).

It should be understood that the four reference neural networks 2220A-D are representative of any number of reference neural networks that may be employed in tandem with base neural network 2200. Additionally, the number of hidden layers that provide values to reference neural networks may vary from embodiment to embodiment. Still further, values from multiple layers may be provided to a single reference neural network. Alternatively, or additionally, values from a first portion of a given layer may be provided to a first reference neural network while values from a second portion of the given layer may be provided to a second reference neural network. In other words, the routing of values from hidden layers to reference neural networks may vary from embodiment to embodiment.

Referring now to FIG. 23, a process is depicted for training reference machine learning models associated with a base machine learning model, in accordance with one or more embodiments of the current subject matter. A given input dataset is provided as an input to a trained version of a base machine learning model, where the given input dataset is part of an original training dataset used to generate the trained version of the base machine learning model (block 2305). During training, the original training dataset is used to train the base machine learning model to generate the trained version of the base machine learning model. The given input dataset is part of the original training dataset. In block 2305, the given input dataset is provided as an input to a trained version of a base machine learning model. Next, one or more reference machine learning models are trained with intermediate values from one or more hidden layers of the trained version of the base machine learning model, where each output vector of each reference machine learning model includes an output value corresponding to each input dataset of the original training dataset (block 2310). In other words, while the trained version of the base machine learning model is processing the given input dataset, intermediate values from one or more hidden layers are provided as inputs to a given reference machine learning model. The known output of the given reference machine learning model for the purposes of training will be a value of 1 for the output node corresponding to the given input dataset and a value of 0 for output nodes corresponding to the other input datasets of the original training dataset. Any number of reference machine learning models may be trained using intermediate values from any number of hidden layers of the trained version of the base machine learning model. After block 2310, method 2300 may end.

It is noted that method 2300 may be performed for each original input dataset in the original training dataset. For example, if there are 1000 original input datasets in the original training dataset, method 2300 may be performed 1000 times, once for each original input dataset in the original training dataset. It is also noted that the base machine learning model may be any of various types of artificial intelligence models (e.g., neural networks, large language models, inference engines, generative pre-trained transformers, generative adversarial networks).

Turning now to FIG. 24, a process is depicted for determining which training input datasets most closely match a non-training input dataset, in accordance with one or more embodiments of the current subject matter. A non-training input dataset is provided as an input to a trained version of a base neural network, where the non-training input dataset is not part of a training dataset used to train the base neural network (block 2405). In other words, the non-training input dataset is a new input dataset that has not yet been processed by either the untrained version (i.e., pre-trained version) of the base neural network or the trained version of the base neural network. While processing the non-training input dataset, intermediate values from one or more hidden layers of the base neural network are provided as inputs to one or more trained versions of reference neural networks (block 2410). In other words, intermediate values generated by one or more hidden layers of the trained base neural network are coupled as inputs to one or more trained reference neural networks. In an example, a first set of intermediate values from a first hidden layer of the trained base neural network are provided as inputs to an input layer of a first reference neural network which has already been trained, a second set of intermediate values from a second hidden layer of the trained base neural network are provided as inputs to an input layer of a second reference neural network which has already been trained, a third set of intermediate values from a third hidden layer of the trained base neural network are provided as inputs to an input layer of a third reference neural network which has already been trained, and so on.

Next, the one or more trained versions of reference neural networks generate output vectors which identify which training input datasets most closely match with the non-training input dataset (block 2415). In other words, the output vector generated by each trained reference neural network indicates which of the training input datasets most closely resemble the non-training input dataset. In an example, if the training dataset used to train the base neural network has 1000 images of cats and dogs, then the output vector generated by a trained reference neural network will have 1000 separate output values. These 1000 output values will indicate which of the original 1000 images of cats and dogs most closely match with the new, non-training input dataset. For example, these 1000 output values may be sorted from highest to lowest values, and then these sorted values will provide a ranking of the original 1000 images in terms of their similarity to the new input dataset.

Then, one or more actions may be performed based on the generated output vectors (block 2420). For example, various graphical elements may be generated in a GUI to indicate close matches between the new input dataset and one or more training input datasets based on the generated output vectors. In an example, when the input datasets are images, the new input image may be generated in a GUI alongside a training image that closely resembles the new input image. Also, in another example, a link may be established between the new input dataset and one or more training input datasets based on being similar or being closely matched. Additionally or alternatively, the new input dataset may be added to one or more training datasets based on the generated output vectors. After block 2420, method 2400 may end. It should be understood that while method 2400 is described in terms of neural networks, these neural networks are representative of any type of machine learning model or artificial intelligence model/engine. In other words, method 2400 may be implemented with any suitable type of machine learning model and/or artificial intelligence model/engine.

Figure 25A:
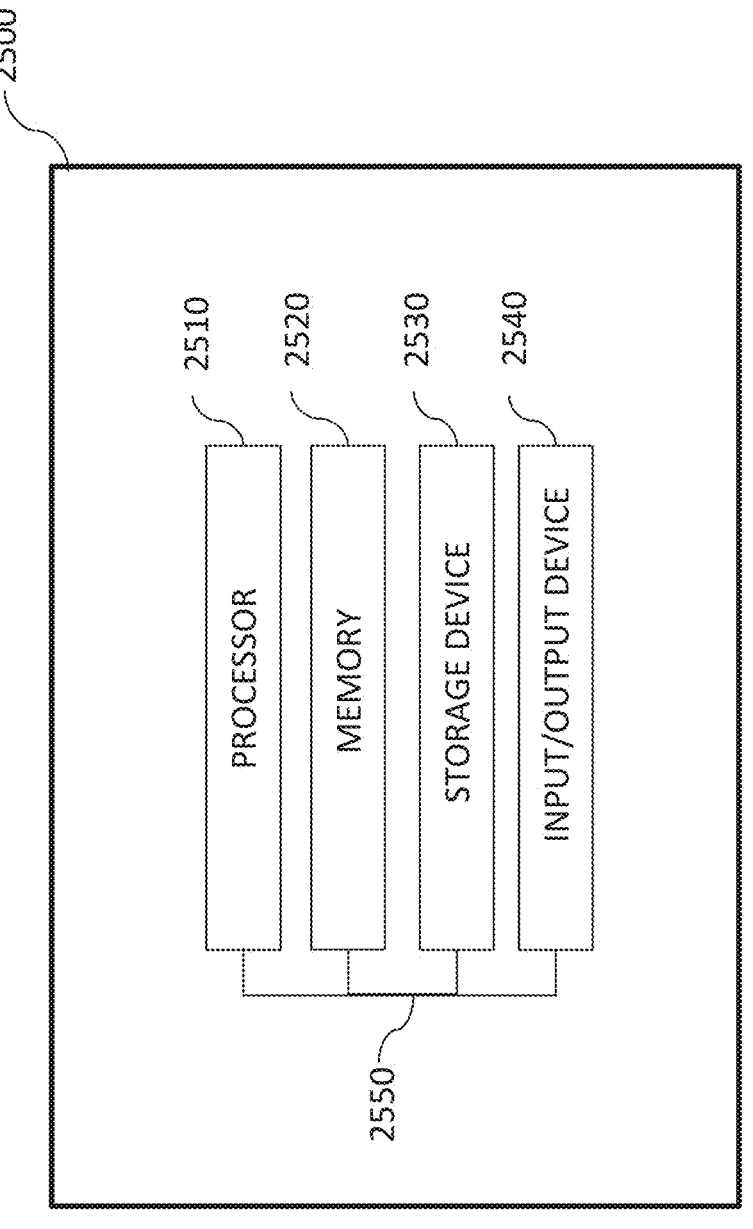
FIG. 25A depicts an example of a system, in accordance with some example implementations of the current subject matter.

In some implementations, the current subject matter may be configured to be implemented in a system 2500, as shown in FIG. 25A. The system 2500 may include a processor 2510, a memory 2520, a storage device 2530, and an input/output device 2540. Each of the components 2510, 2520, 2530 and 2540 may be interconnected using a system bus 2550. The processor 2510 may be configured to process instructions for execution within the system 2500. In some implementations, the processor 2510 may be a single-threaded processor. In alternate implementations, the processor 2510 may be a multi-threaded processor. The processor 2510 may be further configured to process instructions stored in the memory 2520 or on the storage device 2530, including receiving or sending information through the input/output device 2540. The memory 2520 may store information within the system 2500. In some implementations, the memory 2520 may be a computer-readable medium. In alternate implementations, the memory 2520 may be a volatile memory unit. In yet some implementations, the memory 2520 may be a non-volatile memory unit. The storage device 2530 may be capable of providing mass storage for the system 2500. In some implementations, the storage device 2530 may be a computer-readable medium. In alternate implementations, the storage device 2530 may be a floppy disk device, a hard disk device, an optical disk device, a tape device, non-volatile solid state memory, or any other type of storage device. The input/output device 2540 may be configured to provide input/output operations for the system 2500. In some implementations, the input/output device 2540 may include a keyboard and/or pointing device. In alternate implementations, the input/output device 2540 may include a display unit for displaying graphical user interfaces.

Figure 25B:
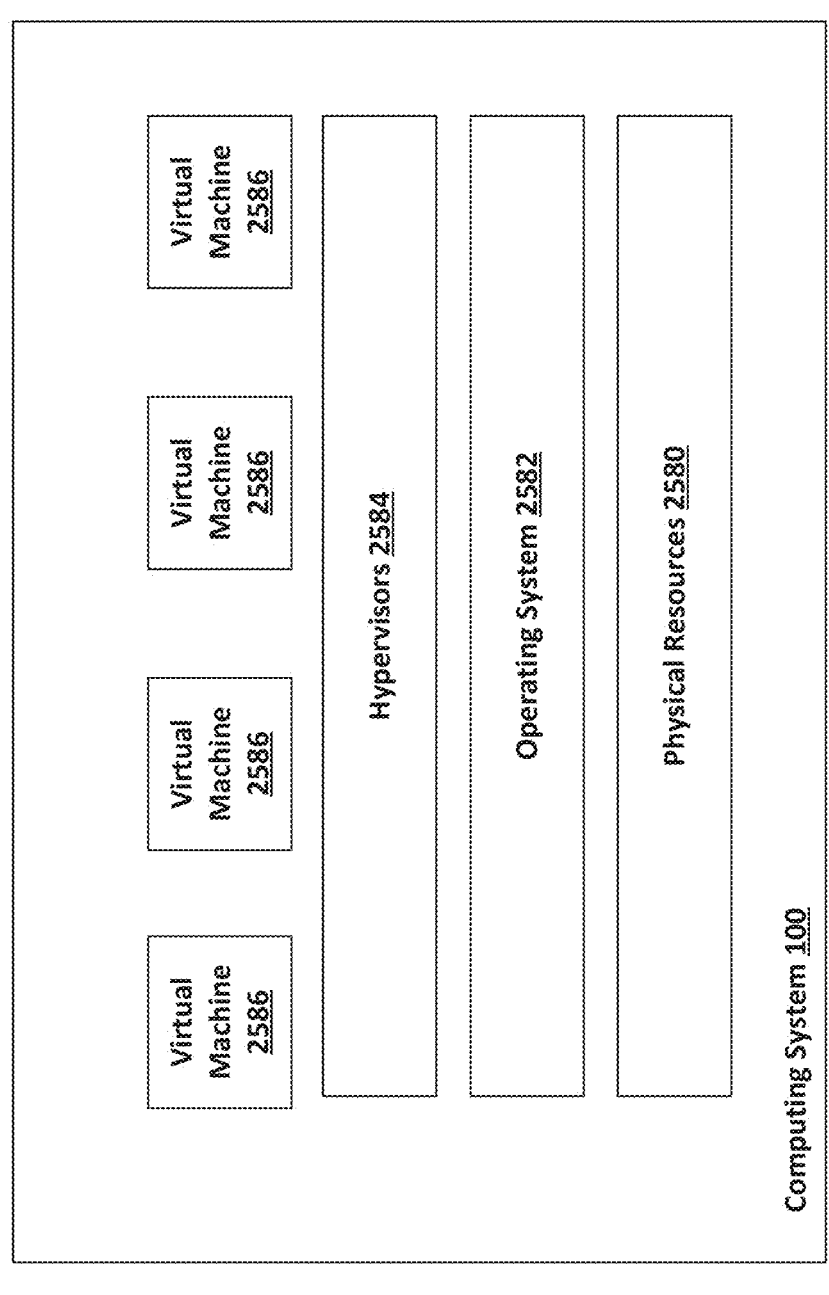
FIG. 25B depicts another example of a system, in accordance with some example implementations of the current subject matter.

FIG. 25B depicts an example implementation of the computing system 100 (of FIG. 1). The computing system 100 may be implemented using various physical resources 2580, such as at least one or more hardware servers, at least one storage, at least one memory, at least one network interface, and the like. The computing system 100 may also be implemented using infrastructure, as noted above, which may include at least one operating system 2582 for the physical resources 2580 and at least one hypervisor 2584 (which may create and run at least one virtual machine 2586). For example, each multitenant application may be run on a corresponding virtual machine 2586.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method, comprising: computer-implemented method comprising: training a machine learning model with a training dataset, wherein the machine learning model comprises a plurality of layers; monitoring, during training, values of a plurality of coefficients of one or more layers; responsive to detecting a change of a given coefficient by more than a threshold during a given training run, storing a given reference to a given input dataset of the given training run; responsive to detecting an output error of a trained version of the machine learning model: retrieving the given reference to the given input dataset in response to the given coefficient being located on a backward path providing more than a threshold contribution to the output error; and providing the given reference to an application analyzing the trained version of the machine learning model to determine a cause of the output error.

Example 2: The computer-implemented method of Example 1, further comprising generating, in a graphical user interface, an indication of the given input dataset as a likely cause of the output error.

Example 3: The computer-implemented method of any of Examples 1-2, further comprising removing the given input dataset from the training dataset to prevent the given input dataset from being used in future training runs.

Example 4: The computer-implemented method of any of Examples 1-3, further comprising retraining the machine learning model with a truncated version of the training dataset after the given input dataset has been removed from the training dataset.

Example 5: The computer-implemented method of any of Examples 1-4, further comprising: tracking changes to a plurality of coefficients during training of the machine learning model with the training dataset; maintaining, for each coefficient of the plurality of coefficients, a first variable tracking a largest change for the coefficient in a positive direction; maintaining, for each coefficient of the plurality of coefficients, a second variable tracking a largest change for the coefficient in a negative direction; storing, for each coefficient of the plurality of coefficients, a first reference to a first input dataset which caused the largest change for the coefficient in the positive direction; and storing, for each coefficient of the plurality of coefficients, a second reference to a second input dataset which caused the largest change for the coefficient in the negative direction.

Example 6: The computer-implemented method of any of Examples 1-5, further comprising: detecting a first output result vector generated by the trained version of the machine learning model; identifying, from the first output result vector, an output result node having a highest value; and backtracking from the output result node to a previous layer of the trained version of the machine learning model along a backward path providing a largest contribution to the output result node.

Example 7: The computer-implemented method of any of Examples 1-6, further comprising collecting a first reference corresponding to a first coefficient of a first node of a first hidden layer on the backward path providing the largest contribution to the output result node, wherein the first node provides a first value to the output result node.

Example 8: The computer-implemented method of any of Examples 1-7, further comprising backtracking from the first node of the first hidden layer to a second node of a second hidden layer on the backward path providing the largest contribution to the first node.

Example 9: The computer-implemented method of any of Examples 1-8, further comprising collecting a second reference corresponding to a second coefficient of the second node of the second hidden layer on the backward path providing the largest contribution to the first node, wherein the second node provides a second value to the first node.

Example 10: The computer-implemented method of any of Examples 1-9, further comprising: comparing the second value to a second threshold; collecting the second reference corresponding to the second coefficient of the second node of the second hidden layer on the backward path responsive to determining the second value is greater than the second threshold; and finalizing and publishing a list of collected references, including the first reference but omitting the second reference, responsive to determining the second value is less than or equal to the second threshold.

Example 11: A computing system comprising: at least one processor; at least one memory storing instructions that, when executed by the at least one processor, cause operations comprising: training a machine learning model with a training dataset, wherein the machine learning model comprises a plurality of layers; monitoring, during training, values of a plurality of coefficients of one or more layers; responsive to detecting a change of a given coefficient by more than a threshold during a given training run, storing a given reference to a given input dataset of the given training run; responsive to detecting an output error of a trained version of the machine learning model: retrieving the given reference to the given input dataset in response to the given coefficient being located on a backward path providing more than a threshold contribution to the output error; and providing the given reference to an application analyzing the trained version of the machine learning model to determine a cause of the output error.

Example 12: The system of Example 11, wherein the operations further comprise generating, in a graphical user interface, an indication of the given input dataset as a likely cause of the output error.

Example 13: The system of any of Examples 11-12, wherein the operations further comprise removing the given input dataset from the training dataset to prevent the given input dataset from being used in future training runs.

Example 14: The system of any of Examples 11-13, wherein the operations further comprise retraining the machine learning model with a truncated version of the training dataset after the given input dataset has been removed from the training dataset.

Example 15: The system of any of Examples 11-14, wherein the operations further comprise: tracking changes to a plurality of coefficients during training of the machine learning model with the training dataset; maintaining, for each coefficient of the plurality of coefficients, a first variable tracking a largest change for the coefficient in a positive direction; maintaining, for each coefficient of the plurality of coefficients, a second variable tracking a largest change for the coefficient in a negative direction; storing, for each coefficient of the plurality of coefficients, a first reference to a first input dataset which caused the largest change for the coefficient in the positive direction; and storing, for each coefficient of the plurality of coefficients, a second reference to a second input dataset which caused the largest change for the coefficient in the negative direction.

Example 16: The system of any of Examples 11-15, wherein the operations further comprise: detecting a first output result vector generated by the trained version of the machine learning model; identifying, from the first output result vector, an output result node having a highest value; and backtracking from the output result node to a previous layer of the trained version of the machine learning model along a backward path providing a largest contribution to the output result node.

Example 17: The system of any of Examples 11-16, wherein the operations further comprise collecting a first reference corresponding to a first coefficient of a first node of a first hidden layer on the backward path providing the largest contribution to the output result node, wherein the first node provides a first value to the output result node.

Example 18: The system of any of Examples 11-17, wherein the operations further comprise backtracking from the first node of the first hidden layer to a second node of a second hidden layer on the backward path providing the largest contribution to the first node.

Example 19: The system of any of Examples 11-18, wherein the operations further comprise collecting a second reference corresponding to a second coefficient of the second node of the second hidden layer on the backward path providing the largest contribution to the first node, wherein the second node provides a second value to the first node.

Example 20: A non-transitory computer readable medium storing instructions, which when executed by at least one data processor, result in operations comprising: training a machine learning model with a training dataset, wherein the machine learning model comprises a plurality of layers; monitoring, during training, values of a plurality of coefficients of one or more layers; responsive to detecting a change of a given coefficient by more than a threshold during a given training run, storing a given reference to a given input dataset of the given training run; responsive to detecting an output error of a trained version of the machine learning model: retrieving the given reference to the given input dataset in response to the given coefficient being located on a backward path providing more than a threshold contribution to the output error; and providing the given reference to an application analyzing the trained version of the machine learning model to determine a cause of the output error.

Example 21: The method of any of Examples 1-10, further comprising: providing a second input dataset as an input to the trained version of the machine learning model; coupling a plurality of intermediate values from one or more hidden layers of the trained version of the machine learning model as inputs to a trained version of a reference machine learning model; and generating, by the trained version of the reference machine learning model, an indication of which training input dataset of the training dataset most closely matches with the second input dataset.

Example 22: The system of any of Examples 11-19, wherein the operations further comprise: providing a second input dataset as an input to the trained version of the machine learning model; coupling a plurality of intermediate values from one or more hidden layers of the trained version of the machine learning model as inputs to a trained version of a reference machine learning model; and generating, by the trained version of the reference machine learning model, an indication of which training input dataset of the training dataset most closely matches with the second input dataset.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
training a machine learning model with a training dataset, wherein the machine learning model comprises a plurality of layers;
monitoring, during training, values of a plurality of coefficients of one or more layers;
responsive to detecting a change of a given coefficient by more than a threshold during a given training run, storing a given reference to a given input dataset of the given training run;
responsive to detecting an output error of a trained version of the machine learning model:
retrieving the given reference to the given input dataset in response to the given coefficient being located on a backward path providing more than a threshold contribution to the output error; and
providing the given reference to an application analyzing the trained version of the machine learning model to determine a cause of the output error.

2. The computer-implemented method of claim 1, further comprising generating, in a graphical user interface, an indication of the given input dataset as a likely cause of the output error.

3. The computer-implemented method of claim 1, further comprising:
providing a second input dataset as an input to the trained version of the machine learning model;
coupling a plurality of intermediate values from one or more hidden layers of the trained version of the machine learning model as inputs to a trained version of a reference machine learning model; and
generating, by the trained version of the reference machine learning model, an indication of which training input dataset of the training dataset most closely matches with the second input dataset.

4. The computer-implemented method of claim 1, further comprising:
removing the given input dataset from the training dataset to prevent the given input dataset from being used in future training runs; and
retraining the machine learning model with a truncated version of the training dataset after the given input dataset has been removed from the training dataset.

5. The computer-implemented method of claim 1, further comprising:
tracking changes to the plurality of coefficients during training of the machine learning model with the training dataset;
maintaining a first variable tracking a largest change for each coefficient of the plurality of coefficients in a positive direction;
maintaining a second variable tracking a largest change for each coefficient of the plurality of coefficients in a negative direction;
storing a first reference to a first input dataset which caused the largest change for each coefficient of the plurality of coefficients in the positive direction; and
storing a second reference to a second input dataset which caused the largest change for each coefficient of the plurality of coefficients in the negative direction.

6. The computer-implemented method of claim 1, further comprising:

detecting a first output result vector generated by the trained version of the machine learning model;

identifying, from the first output result vector, an output result node having a highest value; and backtracking from the output result node to a previous layer of the trained version of the machine learning model along a backward path providing a largest contribution to the output result node.

7. The computer-implemented method of claim 6, further comprising collecting a first reference corresponding to a first coefficient of a first node of a first hidden layer on the backward path providing the largest contribution to the output result node, wherein the first node provides a first value to the output result node.

8. The computer-implemented method of claim 7, further comprising backtracking from the first node of the first hidden layer to a second node of a second hidden layer on a backward path providing a largest contribution to the first node.

9. The computer-implemented method of claim 8, further comprising collecting a second reference corresponding to a second coefficient of the second node of the second hidden layer on the backward path providing the largest contribution to the first node, wherein the second node provides a second value to the first node.

10. The computer-implemented method of claim 9, further comprising:

comparing the second value to a second threshold;

collecting the second reference corresponding to the second coefficient of the second node of the second hidden layer on the backward path providing the largest contribution to the first node responsive to determining the second value is greater than the second threshold; and finalizing and publishing a list of collected references, including the first reference but omitting the second reference, responsive to determining the second value is less than or equal to the second threshold.

11. A computing system comprising:

at least one processor;

at least one memory storing instructions that, when executed by the at least one processor, cause operations comprising:

training a machine learning model with a training dataset, wherein the machine learning model comprises a plurality of layers;

monitoring, during training, values of a plurality of coefficients of one or more layers;

responsive to detecting a change of a given coefficient by more than a threshold during a given training run, storing a given reference to a given input dataset of the given training run;

responsive to detecting an output error of a trained version of the machine learning model:

retrieving the given reference to the given input dataset in response to the given coefficient being located on a backward path providing more than a threshold contribution to the output error; and providing the given reference to an application analyzing the trained version of the machine learning model to determine a cause of the output error.

12. The system of claim 11, wherein the operations further comprise generating, in a graphical user interface, an indication of the given input dataset as a likely cause of the output error.

13. The system of claim 11, wherein the operations further comprise:

providing a second input dataset as an input to the trained version of the machine learning model;

coupling a plurality of intermediate values from one or more hidden layers of the trained version of the machine learning model as inputs to a trained version of a reference machine learning model; and generating, by the trained version of the reference machine learning model, an indication of which training input dataset of the training dataset most closely matches with the second input dataset.

14. The system of claim 11, wherein the operations further comprise:

removing the given input dataset from the training dataset to prevent the given input dataset from being used in future training runs; and retraining the machine learning model with a truncated version of the training dataset after the given input dataset has been removed from the training dataset.

15. The system of claim 11, wherein the operations further comprise:

tracking changes to the plurality of coefficients during training of the machine learning model with the training dataset;

maintaining a first variable tracking a largest change for each coefficient of the plurality of coefficients in a positive direction;

maintaining a second variable tracking a largest change for each coefficient of the plurality of coefficients in a negative direction;

storing a first reference to a first input dataset which caused the largest change for each coefficient of the plurality of coefficients in the positive direction; and storing a second reference to a second input dataset which caused the largest change for each coefficient of the plurality of coefficients in the negative direction.

16. The system of claim 11, wherein the operations further comprise:

detecting a first output result vector generated by the trained version of the machine learning model;

identifying, from the first output result vector, an output result node having a highest value; and backtracking from the output result node to a previous layer of the trained version of the machine learning model along a backward path providing a largest contribution to the output result node.

17. The system of claim 16, wherein the operations further comprise collecting a first reference corresponding to a first coefficient of a first node of a first hidden layer on the backward path providing the largest contribution to the output result node, wherein the first node provides a first value to the output result node.

18. The system of claim 17, wherein the operations further comprise backtracking from the first node of the first hidden layer to a second node of a second hidden layer on a backward path providing a largest contribution to the first node.

19. The system of claim 18, wherein the operations further comprise collecting a second reference corresponding to a second coefficient of the second node of the second hidden layer on the backward path providing the largest contribution to the first node, wherein the second node provides a second value to the first node.

20. A non-transitory computer readable medium storing instructions, which when executed by at least one data processor, result in operations comprising:

training a machine learning model with a training dataset, wherein the machine learning model comprises a plurality of layers;

monitoring, during training, values of a plurality of coefficients of one or more layers; 5 responsive to detecting a change of a given coefficient by more than a threshold during a given training run, storing a given reference to a given input dataset of the given training run;

responsive to detecting an output error of a trained version 10 of the machine learning model:

retrieving the given reference to the given input dataset in response to the given coefficient being located on a backward path providing more than a threshold contribution to the output error; and 15 providing the given reference to an application analyzing the trained version of the machine learning model to determine a cause of the output error.

\* \* \* \* \*